(12) United States Patent
Stoicescu et al.

(10) Patent No.: US 12,399,592 B2
(45) Date of Patent: Aug. 26, 2025

(54) CAPACITIVE MICROMACHINED ULTRASONIC TRANSDUCER (CMUT) MULTI-TOUCH AND SLIDER DETECTION WITH IMPROVED PIXEL AREA COVERAGE AND ULTRASONIC FEEDBACK BY A SAME PIXEL ARRAY

(71) Applicant: Infineon Technologies AG, Neubiberg (DE)

(72) Inventors: Emanuel Stoicescu, Bucharest (RO); Matthias Eberl, Taufkirchen (DE); Mohanraj Soundara Pandian, Unterschleißheim (DE); Klaus Elian, Alteglofsheim (DE); Costin Batrinu, Bucharest (RO)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 18/469,010

(22) Filed: Sep. 18, 2023

(65) Prior Publication Data

US 2024/0192809 A1    Jun. 13, 2024

Related U.S. Application Data

(60) Provisional application No. 63/386,336, filed on Dec. 7, 2022.

(51) Int. Cl.
*G06F 3/043* (2006.01)
*G06F 3/041* (2006.01)

(52) U.S. Cl.
CPC ............ *G06F 3/043* (2013.01); *G06F 3/0416* (2013.01)

(58) Field of Classification Search
CPC ....................................................... G06F 3/043
See application file for complete search history.

(56) References Cited

U.S. PATENT DOCUMENTS

2019/0354209 A1* 11/2019 Tang .................... G01S 15/8925
2020/0356196 A1* 11/2020 Strohmann ......... G01S 7/52026

* cited by examiner

*Primary Examiner* — Gustavo Polo
(74) *Attorney, Agent, or Firm* — Harrity & Harrity, LLP

(57) ABSTRACT

An ultrasonic touch sensor includes a touch structure having a touch surface with a plurality of sensitive areas, a pixel array of capacitive ultrasonic transducers, and a sensor circuit. Each pixel includes a respective ultrasonic transmitter and a respective ultrasonic receiver and is configured to monitor for a touch at a respective first sensitive area and at a respective second sensitive area. Moreover, each pixel is configured to generate a measurement signal that is representative of a first respective ultrasonic reflected wave reflected by the touch interface at the respective first sensitive area or that is representative of a second respective ultrasonic reflected wave reflected by the touch interface at the respective second sensitive area. The sensor circuit is configured to determine whether the measurement signal of a respective pixel corresponds to the respective first sensitive area or to the respective second sensitive area associated with the respective pixel.

30 Claims, 7 Drawing Sheets

CAPACITIVE MICROMACHINED ULTRASONIC TRANSDUCER (CMUT) MULTI-TOUCH AND SLIDER DETECTION WITH IMPROVED PIXEL AREA COVERAGE AND ULTRASONIC FEEDBACK BY A SAME PIXEL ARRAY

CROSS REFERENCE TO RELATED APPLICATION

This patent application claims priority to U.S. Provisional Patent Application No. 63/386,336, filed on Dec. 7, 2022, and entitled "CAPACITIVE MICROMACHINED ULTRASONIC TRANSDUCER (CMUT) MULTITOUCH AND SLIDER DETECTION WITH IMPROVED PIXEL AREA COVERAGE AND ULTRASONIC FEEDBACK BY A SAME PIXEL ARRAY." The disclosure of the prior application is considered part of and is incorporated by reference into this patent application.

BACKGROUND

Touch sensing through metal surfaces using ultrasound waves is currently being investigated as an alternative to capacitive touch sensing principles. Ultrasonic sensing relies on a transmission of an ultrasound wave directed at a touch structure and a reception and processing of a reflected waveform that is reflected back from the touch structure. A characteristic of the reflected waveform will depend on an existence or a non-existence of a touch event and can be used to discriminate between the existence or the non-existence of the touch event.

SUMMARY

In some implementations, an ultrasonic touch sensor includes a housing having an ultrasound chamber; a touch structure arranged over the ultrasound chamber, wherein the touch structure comprises a touch surface having a plurality of sensitive areas configured to receive at least one touch, wherein the touch structure comprises a touch interface at the touch surface, wherein neighboring sensitive areas of the plurality of sensitive areas are contiguous or partially overlapping, and wherein the plurality of sensitive areas include a plurality of first sensitive areas and a plurality of second sensitive areas interleaved with the plurality of first sensitive areas on a first alternating basis; a pixel array of capacitive ultrasonic transducers comprising a plurality of pixels, wherein each pixel of the plurality of pixels includes a respective capacitive ultrasonic transmitter and a respective capacitive ultrasonic receiver, wherein each pixel of the plurality of pixels is configured to monitor for the at least one touch at a respective first sensitive area of the plurality of first sensitive areas and at a respective second sensitive area of the plurality of second sensitive areas, and wherein each pixel of the plurality of pixels is configured to generate a measurement signal that is representative of a first respective ultrasonic reflected wave reflected by the touch interface at the respective first sensitive area or that is representative of a second respective ultrasonic reflected wave reflected by the touch interface at the respective second sensitive area; and a sensor circuit configured to receive the measurement signal of a respective pixel of the plurality of pixels and determine whether the measurement signal of the respective pixel corresponds to the respective first sensitive area or to the respective second sensitive area of the respective pixel.

In some implementations, an ultrasonic touch sensor includes a housing having an ultrasound chamber; a touch structure arranged over the ultrasound chamber, wherein the touch structure comprises a touch surface having a plurality of sensitive areas configured to receive at least one touch, wherein the touch structure comprises a touch interface at the touch surface, wherein neighboring sensitive areas of the plurality of sensitive areas are contiguous or partially overlapping; and a pixel array of capacitive ultrasonic transducers comprising a plurality of pixels, wherein each pixel of the plurality of pixels includes a respective plurality of capacitive ultrasonic transmitters and a respective plurality of capacitive ultrasonic receivers, wherein the respective plurality of capacitive ultrasonic transmitters of each pixel is configured to generate a scanning beam that is steered in a sweeping motion to scan a respective sensitive area of the plurality of sensitive areas.

BRIEF DESCRIPTION OF THE DRAWINGS

Implementations are described herein with reference to the appended drawings.

DETAILED DESCRIPTION

Figure 1:
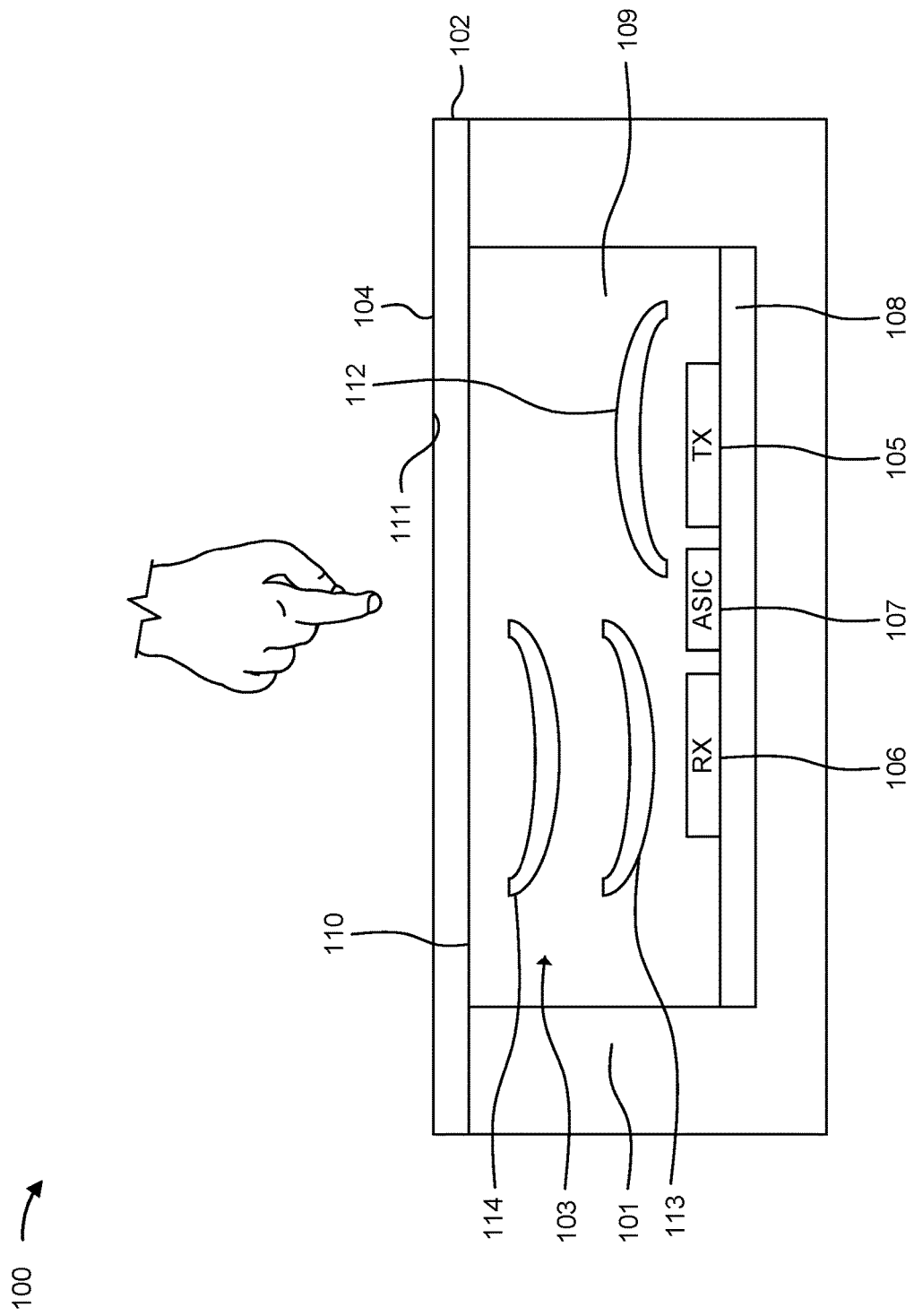
FIG. 1 illustrates an ultrasonic touch sensor according to one or more implementations.

In the following, details are set forth to provide a more thorough explanation of example implementations. However, it will be apparent to those skilled in the art that these implementations may be practiced without these specific details. In other instances, well-known structures and devices are shown in block diagram form or in a schematic view rather than in detail in order to avoid obscuring the implementations. In addition, features of the different implementations described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

In this regard, directional terminology, such as "top," "bottom," "below," "above," "front," "behind," "back," "leading," "trailing," etc., may be used with reference to an orientation of the figures being described. Because parts of the implementations, described herein, can be positioned in a number of different orientations, the directional terminology is used for purposes of illustration and is in no way limiting. It is to be understood that other implementations may be utilized and structural or logical changes may be made without departing from the scope defined by the claims. The following detailed description, therefore, is not to be taken in a limiting sense.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In implementations described herein or shown in the drawings, any direct electrical connection or coupling, e.g., any connection or coupling without additional intervening elements, may also be implemented by an indirect connection or coupling, e.g., a connection or coupling with one or more additional intervening elements, or vice versa, as long as the general purpose of the connection or coupling, for example, to transmit a certain kind of signal or to transmit a certain kind of information, is essentially maintained. Features from different implementations may be combined to form further implementations. For example, variations or modifications described with respect to one of the implementations may also be applicable to other implementations unless noted to the contrary.

The terms "substantially" and "approximately" may be used herein to account for small manufacturing tolerances or other factors (e.g., within 5%) that are deemed acceptable in the industry without departing from the aspects of the implementations described herein. For example, a resistor with an approximate resistance value may practically have a resistance within 5% of that approximate resistance value.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

A "sensor" may refer to a component which converts a property to be measured to an electrical signal (e.g., a current signal or a voltage signal). For an ultrasonic touch sensor, the property is an ultrasound wave produced, for example, by a microelectromechanical system (MEMS) transducer. The ultrasound wave is directed at a touch structure where the ultrasound wave is reflected back by the touch structure as a reflected ultrasound wave. The reflected ultrasound wave can be used for sensing touch (e.g., a touch event) through metal surfaces. Specifically, the ultrasonic touch sensor can use the reflected ultrasound wave to discriminate between an existence of the touch event or a non-existence of the touch event (e.g., a no-touch event). However, there may be gaps between sensitive areas on a touch surface, which does not allow touches to be detected in the areas of the touch surface that correspond to the gaps. This may result in a lower spatial resolution at the touch surface and/or an intermittent sliding-touch signal to be generated. The intermittent sliding-touch signal is a non-continuous signal that has signal breaks or gaps caused by the gaps between sensitive areas. As a result, the intermittent sliding-touch signal does not allow continuous touch detection during a sliding motion of a touch applied across the touch surface. The gaps between sensitive areas may be caused by a large pixel pitch, that may be required in certain applications or due to cost constraints, and/or may be caused when a resolution of the sensitive area is the same resolution as the pixel pitch.

Some implementations disclosed herein are directed to using coupled pixels in combination with time interleaving of exciting a plurality of transmitter transducers with simultaneous reception at adjacent pixels and/or at adjacent receiver transducers. In other words, the transmitter transducers are excited in a sequence to sequentially transmit ultrasound waves. Receiver transducers located adjacent to a transmitting transmitter transducer are used to simultaneously evaluate reflected ultrasound waves (e.g., echoes) to discriminate an area of the touch surface from which a reflected ultrasound wave originates.

Additionally, or alternatively, some implementations disclosed herein are directed to using coupled pixels in combination, using different transmission parameters between different transmit transducers (e.g., TX1 and TX2), such as frequency, modulation type and parameters, etc., to discriminate an area of the touch surface from which a reflected ultrasound wave originates.

Additionally, or alternatively, some implementations disclosed herein are directed to beam steering that is used to enlarge the sensitive areas above each pixel in order to reduce or eliminate gaps in sensitivity on the touch surface. For example, beam steering may be implemented by dividing each pixel in a sub-cell array and phase-shifting the electrical control signals (e.g., the excitation signals) of the sub-cells.

Additionally, or alternatively, some implementations disclosed herein are directed to reconfiguring an array of transducers (e.g., a CMUT array) after an initial touch detection into a mid-air focused, localized haptic feedback system. For example, after a positive touch detection, the CMUT array can be reconfigured to focus a beam of a haptic feedback ultrasonic wave at an area of the touch surface at which the initial touch was detected, for example, to focus the beam into the finger.

FIG. 1 illustrates an ultrasonic touch sensor 100 according to one or more implementations. The ultrasonic touch sensor 100 includes a housing comprising a frame 101 and a touch structure 102 (e.g., a touch substrate) that form an ultrasound chamber 103. The frame 101 may be made of an encapsulant, such as overmolded thermoplastic or another type of molding material. As part of the housing, the frame 101 may have a recess that becomes the ultrasound chamber 103 when the touch structure 102 encloses the recess. In some implementations, part of the frame 101 may extend into and fill the ultrasound chamber 103, thereby covering one or more sensor components arranged therein. Epoxy or some other ultrasound-compatible material cast in the recess may be used. Accordingly, an area of the housing in which ultrasonic transducers reside may be referred to as an acoustic port, an ultrasound port, an acoustic chamber, or an ultrasound chamber, among other examples.

In either case, the touch structure 102 is used as a lid or a package cover that rests upon a touch side of the ultrasonic touch sensor 100. In the example shown, the ultrasound chamber 103 is an internal area or a cavity that is formed by the enclosure of the frame 101 and the touch structure 102. The touch structure 102 may be made of one or more metal layers, one or more plastic layers, and/or one or more layers made out of another solid material. Thus, the touch structure 102 may be a covering coupled to the frame 101, and the ultrasound chamber 103 may be an internal area that is defined, at least in part, by the touch structure 102 (e.g., an internal area defined between the frame 101 and the touch structure 102). The touch structure 102 includes a touch surface 104 at its external interface with an environment. The touch surface 104 is arranged and operable to receive contact (e.g., touches) from a user that can be detected by sensor circuitry.

In some implementations, lateral sides of the frame 101 may be at least partially open such that the ultrasound chamber 103 is not a fully enclosed volume. For example, the lateral sides of the frame 101 may include columns that support the touch structure 102 and/or the touch structure 102 may be supported by a coupling medium. For example, the coupling medium, such as a film layer, a silicone gel, or a soft epoxy, may be provided in the ultrasound chamber 103 and may be mechanically coupled to and between a circuit substrate at a bottom side of the ultrasound chamber 103 and the touch structure 102 at a top side of the ultrasound chamber 103 to provide support to the touch structure 102. In some implementations, the lateral sides of the ultrasound chamber 103 may be fully open, with the lateral sides of the frame 101 being absent, and the touch structure 102 may be partially or fully supported by the coupling medium. Thus, the coupling medium may be sufficiently rigid to support the touch structure 102 in cases which the lateral sides of the ultrasound chamber 103 are fully open.

The ultrasound chamber 103 contains the sensor circuitry used for detecting no-touch events and touch events at the touch surface 104. A touch event is an instance when the user makes contact with the touch surface 104, and a no-touch event is any other circumstance, including the occurrence of disturbing influences (e.g., error sources) that may occur in the absence of a touch event. The sensor circuitry is configured to distinguish between a touch event and a no-touch event, taking into account possible errors originating from the disturbing influences.

An ultrasound wave is a sound wave having a frequency of 20 kHz or higher. An ultrasound wave may be referred to as an ultrasonic transmit wave when the ultrasound wave is transmitted by a transmitter, and may be referred to as an ultrasonic reflected wave when the ultrasound wave has been reflected by the touch structure 102 for reception at a receiver. The sensor circuitry includes a transmitter (TX) 105 (e.g., a capacitive ultrasonic transmitter) configured to transmit ultrasound waves (e.g., ultrasonic transmit waves), a receiver (RX) 106 (e.g., a capacitive ultrasonic receiver) configured to receive reflected ultrasound waves (e.g., ultrasonic reflected waves), and a sensor circuit 107 (e.g., an application specific integrated circuit (ASIC)). The sensor circuit 107 may be configured to generate the ultrasound waves for transmission by the transmitter 105, and perform signal processing on the reflected ultrasound waves received by the receiver 106. In some implementations, the sensor circuit 107 may be configured to evaluate the reflected ultrasound waves for detecting no-touch events and touch events by applying a first touch detection algorithm, and control one or more components of the ultrasonic touch sensor 100, including the transmitter 105, the receiver 106, or any signal processing components of a signal processing chain of the sensor circuit 107. In some implementations, the sensor circuit 107 may evaluate an additional property of the ultrasonic touch sensor 100 (e.g., an internal pressure, a bias voltage, or a cross-coupling effect) from which a measurement signal is obtained and evaluated for detecting the no-touch events and the touch events by applying a second touch detection algorithm. In some implementations, both the first touch detection algorithm and the second touch detection algorithm may be used in combination for detecting the no-touch events and the touch events.

The transmitter 105 and the receiver 106 may both be sound transducers with a flexible membrane that vibrates to either produce sound waves, in the case of the transmitter 105, or in response to receiving sound waves, in the case of the receiver 106. In particular, the transmitter 105 and the receiver 106 may be capacitive micromachined ultrasonic transducers (CMUTs). In some implementations, the transmitter 105 and the receiver 106 may be combined into a single transceiver transducer that has a single flexible membrane.

A CMUT is a MEMS transducer where an energy transduction is due to a change in capacitance. CMUTs are constructed on silicon using micromachining techniques. A cavity may be formed in a silicon substrate, which serves as a first electrode of a capacitor. A thin layer suspended on a top of the cavity serves as the flexible membrane on which a conductive layer acts a second electrode of the capacitor. The first electrode and the second electrode of the capacitor are biased with a bias voltage (e.g., a DC bias voltage) that establishes an initial operating condition of the MEMS transducer. Accordingly, the first electrode and the second electrode of the capacitor may be referred to as biased electrodes.

When an AC signal is applied across the biased electrodes of the capacitor, the AC signal is superimposed onto the bias voltage. As a result, the flexible membrane will vibrate and produce ultrasound waves in a medium of interest. In this way, the CMUT works as a transmitter. The sensor circuit 107 is configured to generate an excitation signal and transmit the excitation signal to the transmitter 105. The excitation signal is applied across the biased electrodes, causing the flexible membrane to vibrate according to the waveform of the excitation signal and producing a corresponding ultrasound wave. Different excitation signals induce different ultrasound waves. Accordingly, the excitation signal is a signal applied to the transmitter 105 by the sensor circuit 107 to produce an ultrasound wave that is used to detect touch events at the touch surface 104 of the touch structure 102 as well as the applied force thereof. Thus, the sensor circuit 107 may include a signal generator that is configured to generate an excitation signal for producing an ultrasonic wave. The transmitter 105 is configured to receive the excitation signal from the signal generator and transmit the ultrasonic wave based on the excitation signal.

On the other hand, when an ultrasound wave is applied to (e.g., received by) the flexible membrane of a biased CMUT, the flexible membrane will vibrate according to the applied ultrasound wave and the CMUT will generate an alternating signal (e.g., a measurement signal) as the capacitance is varied. In this way, the alternating signal is a measurement signal representative of received ultrasound waves and the CMUT operates as a receiver of the ultrasound waves. It is also possible that each MEMS transducer is configurable as a transceiver that is capable of both transmitting and receiving ultrasound waves.

The transmitter 105, the receiver 106, and the sensor circuit 107 may be arranged on a common circuit substrate 108 (e.g., a printed circuit board (PCB)) that is disposed at a base of the frame 101. The common circuit substrate 108 is configured to electrically couple the sensor circuit 107 to both the transmitter 105 and the receiver 106. The transmitter 105, the receiver 106, and the sensor circuit 107 may be separate integrated circuits (ICs) (e.g., dies) or may be combined in any combination into one or two ICs. Additionally, both the transmitter 105 and the receiver 106 may be implemented as separate transceivers such that two transmitters and two receivers are provided.

A remaining portion of the ultrasound chamber 103 may be filled with a coupling medium 109, such as a silicone gel, a soft epoxy, a liquid, or any other material that enables the propagation of ultrasonic waves with no, or substantially no, attenuation. Thus, the coupling medium 109 may provide acoustic (e.g., ultrasound) coupling between the transmitter 105 and the receiver 106 with no, or substantially no, attenuation. In some implementations, the material of the coupling medium 109 is also configured to provide elastic coupling to the receiver 106 and the touch structure 102 such that the receiver 106 and the touch structure 102 are mechanically coupled by the coupling medium 109. When providing mechanical coupling between the touch structure 102 and the receiver 106, the coupling medium 109 is a non-gaseous medium. In some implementations, the coupling medium 109 may provide structural support to the touch structure 102 (e.g., in instances when the lateral sides of the ultrasound chamber 103 are fully open).

The touch structure 102 has a first interface 110 and a second interface 111 that interacts with ultrasound waves, with the first interface 110 (e.g., an inner interface) being in contact with the coupling medium 109 and the second interface 111 (e.g., a touch interface) being in contact with the environment. The transmitter 105 is configured to transmit an ultrasonic transmit wave 112 toward the touch structure 102 (e.g., at the first interface 110 and the second interface 111). The first interface 110 and the second interface 111 are configured to reflect the ultrasonic transmit wave 112 back into the ultrasound chamber 103 to be received by the receiver 106 as ultrasonic reflected waves 113 and 114, respectively. The receiver 106 converts the ultrasonic reflected waves 113 and 114 into measurement signals for processing and analysis. Specifically, the first interface 110 reflects the ultrasonic transmit wave 112 by internal reflection to produce the ultrasonic reflected wave 113, and the second interface 111 reflects the ultrasonic transmit wave 112 by internal reflection to produce the ultrasonic reflected wave 114. Since the second interface 111 is more distant from the transmitter 105 than the first interface 110, the ultrasonic reflected wave 114 occurs at a later time instance than the occurrence of the ultrasonic reflected wave 113. In this way, both ultrasonic reflected waves 113 and 114 can be measured by a respective measurement signal and evaluated.

The receiver 106 may output a continuous measurement signal while the ultrasonic reflected waves 113 and 114 are received, and the sensor circuit 107 may obtain a first measurement signal from the continuous measurement signal in a first observation window corresponding to the ultrasonic reflected wave 113 and may obtain a second measurement signal from the continuous measurement signal in a second observation window corresponding to the ultrasonic reflected wave 114. Thus, the first measurement signal and the second measurement signal may be different portions of the continuous measurement signal output by the receiver 106. As described in greater detail below, a waveform of the ultrasonic reflected wave 114 may be particularly useful to the sensor circuit 107 for making a touch/no-touch decision because the ultrasonic reflected wave 114 is more sensitive to touches occurring at the second interface 111 (e.g., the touch interface).

Additionally, a timing difference between reception times of the ultrasonic reflected waves 113 and 114 can also be evaluated. Accordingly, the transmitter 105 and the receiver 106 are coupled together by the coupling medium 109. The coupling medium 109 and the touch structure 102 form a propagation channel between the transmitter 105 and the receiver 106.

An acoustic impedance change at the second interface 111 from a touch applied to the touch surface 104 causes a change in the ultrasonic reflected wave 114. In particular, a change in a signal amplitude of the ultrasonic reflected wave 114 occurs when the touch surface 104 is touched by, for example, a finger of the user (e.g., a direct touch with skin making direct contact with the touch surface 104). The change in the ultrasonic reflected wave 114 can be detected or used at a receiver side of the ultrasonic touch sensor 100 for detecting the touch event or the no-touch event, as well as for determining touch location and touch force. Specifically, the touch event at the touch surface 104 may cause a damping effect where part of the energy of the ultrasonic transmit wave 112 is absorbed or dissipated by the finger. Accordingly, the signal amplitude of the ultrasonic reflected wave 114 during the touch event may be reduced relative to the signal amplitude of the ultrasonic reflected wave 114 during the no-touch event. The waveform of the ultrasonic reflected wave 114 during the no-touch event may be used by the sensor circuit 107 as a reference waveform for a touch/no-touch determination. For example, when the waveform of the ultrasonic reflected wave 114 remains similar to the reference waveform, the ultrasonic reflected wave 114 may correspond to a no-touch event. Alternatively, when a difference between the waveform of the ultrasonic reflected wave 114 and the reference waveform satisfies a threshold (e.g., the difference is greater than the threshold, the difference is greater than or equal to the threshold, or the difference satisfies another threshold condition), the ultrasonic reflected wave 114 may correspond to a touch event.

In some implementations, the signal amplitude of the ultrasonic reflected wave 114 during the no-touch event may be used by the sensor circuit 107 as a reference level for the touch/no-touch determination. The sensor circuit 107 may measure the signal amplitude of the ultrasonic reflected wave 114 and compare the signal amplitude and the reference level for the touch/no-touch determination. If a difference between the signal amplitude of the ultrasonic reflected wave 114 and the reference level satisfies a threshold (e.g., the difference is greater than the threshold, the difference is greater than or equal to the threshold, or the difference satisfies another threshold condition), the ultrasonic reflected wave 114 may correspond to a touch event. Therefore, a property of the ultrasonic reflected wave 114 may depend on the existence or the non-existence of the touch event. The property of the reflected ultrasonic sound wave can be measured at the sensor circuit 107 to discriminate between a presence of the touch event or the no-touch event.

Meanwhile, the acoustic impedance change resulting from the touch event may be minimal at the first interface 110. As a result, the acoustic impedance change may not cause a measurable change in a property of the ultrasonic reflected wave 113. In other words, the ultrasonic reflected wave 113 may not undergo a measurable change as a result of a change in the acoustic impedance at the touch surface 104. As a result, the ultrasonic reflected wave 114 may be used for detecting changes in the acoustic impedance at the touch surface 104 for discriminating between the touch event and the no-touch event.

In particular, the touch event at the touch surface 104 of the touch structure 102 causes a change in a property of the propagation channel (e.g., a property at the second interface 111) and thereby changes the propagation of the ultrasound waves through the propagation channel from the transmitter 105 to the receiver 106. In other words, a property of an ultrasound wave propagating along the propagation channel changes in response to a touch event at the touch surface 104 and the sensor circuit 107 is configured to detect the touch event, including one or more characteristics thereof, including an amount of contact pressure, a contact duration, and a contact location on the touch surface 104.

During operation of the ultrasonic touch sensor 100, the sensor circuit 107 is configured to apply a touch detection algorithm to distinguish between the touch event and the no-touch event. The touch detection algorithm may take into account or be insensitive to various disturbances, including electrical and ultrasonic cross-talk, multipath propagation, noise, temperature, and/or environmental disturbances (such as dirt or water) on the touch surface 104. The touch detection algorithm may take into account or be insensitive to various calibration factors, including different touch surfaces, variations in mounting, non-linear behaviors, large offsets, and drifting effects.

In some implementations, the sensor circuit 107 may be configured to generate a first plurality of digital samples from a first signal (e.g., a reference measurement signal) generated by and output from the receiver 106 during a no-touch event (e.g., a reference no-touch event) during an observation window that corresponds to the ultrasonic reflected wave 114 reflected by the second interface 111. The first plurality of digital samples may represent an envelope of the first signal. The sensor circuit 107 may store the first plurality of digital samples as a plurality of reference samples in memory. In other words, the first signal corresponds to the ultrasonic reflected wave 114 received during the no-touch event and is used as a reference signal to be used for making touch/no-touch decisions during a touch monitoring operation. After obtaining and storing the plurality of reference samples, the sensor circuit 107 may be configured to generate a second plurality of digital samples from a second signal (e.g., a monitored measurement signal) generated by and output from the receiver 106 during the touch monitoring operation (e.g., during an excitation frame used for a touch/no-touch decision). The second plurality of digital samples may represent an envelope of the second signal. The sensor circuit 107 may calculate a distance (e.g., a Euclidean distance) of the second plurality of digital samples to the first plurality of digital samples (e.g., to the plurality of reference samples), and determine whether a no-touch event or a touch event has occurred at the touch surface 104 based on the distance. For example, if the distance is less than a threshold, the sensor circuit 107 may detect that a no-touch event has occurred. Alternatively, if the distance is equal to or greater than the threshold, the sensor circuit 107 may detect that a touch event has occurred.

Accordingly, the sensor circuit 107 may be configured to receive a measurement signal from the receiver 106 corresponding to the ultrasonic reflected wave 114 during the touch monitoring operation, compare the measurement signal with the reference signal to generate a comparison result (e.g., whether the measurement signal satisfies a threshold, or a defined correlation between the measurement signal and the reference signal satisfies the threshold), and determine a touch/no-touch decision based on the comparison result.

Alternatively, in some implementations, the first signal (e.g., the reference measurement signal) may be generated by and output from the receiver 106 during a touch event (e.g., a reference touch event). As a result, the plurality of reference samples may correspond to the ultrasonic reflected wave 114 received during the touch event and be stored in memory to be used by the sensor circuit 107 for making touch/no-touch decisions during the touch monitoring operation. Accordingly, in this case, if the distance calculated during the touch monitoring operation is less than a threshold, the sensor circuit 107 may detect that a touch event has occurred, and if the distance calculated during the touch monitoring operation is equal to or greater than the threshold, the sensor circuit 107 may detect that a no-touch event has occurred.

In some implementations, digital samples may be obtained from an ultrasonic reflected wave that is reflected by a different interface during the touch monitoring operation and compared with the reference signal in a similar manner as described above, including calculating a distance (e.g., a Euclidean distance) between the digital samples and reference samples of the reference signal and determining whether a no-touch event or a touch event has occurred at the touch surface based on whether or not the distance satisfies a threshold.

The touch detection algorithm may include a machine learning model that is trained to distinguish between a touch and no-touch event. Machine learning involves computers learning from data to perform tasks. Machine learning algorithms are used to train machine learning models based on sample data, known as "training data." Once trained, machine learning models may be used to make predictions, decisions, or classifications relating to new observations. The sensor circuit 107 may distinguish between a touch and no-touch event using a machine learning model. The machine learning model may include and/or may be associated with, for example, a neural network. In some implementations, the sensor circuit 107 uses the machine learning model to distinguish between a touch and no-touch event by providing candidate parameters as input to the machine learning model, and using the machine learning model to determine a likelihood, probability, or confidence that a particular outcome (e.g., that a no-touch is detected or that a touch is detected at the touch surface 104) for a subsequent touch detection operation will be determined using the candidate parameters. In some implementations, the sensor circuit 107 provides one or more measurements as input to the machine learning model, and the sensor circuit 107 uses the machine learning model to determine or identify a particular result that is most probable (for example, that a no-touch, a touch, a short touch, a long touch, a soft touch, a hard touch, a static touch, a dynamic touch (e.g., a moving touch), a direct touch (e.g., a touch made by direct skin contact with the touch surface 104), and/or an indirect touch (e.g., a touch made by non-skin contact with the touch surface 104) is present at the touch surface 104).

The sensor circuit 107 may train, update, and/or refine the machine learning model to increase the accuracies of the outcomes and/or parameters determined using the machine learning model. The sensor circuit 107 may train, update, and/or refine the machine learning model based on feedback and/or results from the subsequent touch detection operation, as well as from historical or related touch detection operations (e.g., from hundreds, thousands, or more historical or related touch detection operations) performed by the sensor circuit 107.

The touch event at the touch surface 104 of the touch structure 102 may also cause a change in a property of the receiver 106. For example, the touch force of the touch event may change a sensitivity of the receiver 106 due to an internal pressure acting on the flexible membrane of the receiver 106 caused by the touch force. The sensor circuit 107 may exploit this change in sensitivity to detect an external force applied to the touch surface 104, including the touch force of the touch event.

During operation of the ultrasonic touch sensor 100, the sensor circuit 107 may be configured to generate the ultrasonic transmit wave 112 for each touch/no-touch decision by applying an excitation signal. Upon receipt of each ultrasonic reflected wave, the sensor circuit 107 makes a touch/no-touch decision using the touch detection algorithm. A time between subsequent touch detections (i.e., between successive excitation signals) can be on the order of 25 microseconds (µs), for example. A period between triggering an excitation signal and a next excitation signal may be referred to as an excitation frame. The sensor circuit 107 is configured to analyze reflected ultrasound waves for each excitation frame to make a touch/no-touch decision on a frame-by-frame basis. Lower power consumption and higher frame rates (e.g., less time between excitation signals) may be enabled when the touch detection algorithm is lower in complexity, for example, because the sensor circuit 107 is able to make the touch/no-touch decision more quickly when the touch detection algorithm is less complex.

An excitation signal may be a short signal pulse or a pulse train comprised of multiple short pulses (e.g., having a duration of about 100 nanoseconds (ns) up to about 1 µs). An excitation signal can have any shape (e.g., rectangular, sinusoidal, Gaussian, Gaussian derivative, etc.) or may be a chirp signal whose frequency continuously increases or decreases from a start frequency to a stop frequency, for example, by using linear frequency modulation. Thus, an excitation signal may have either a fixed (constant) frequency or a changing (modulated) frequency. In a pulse train, the pulses may have a same frequency or may have different frequencies and/or the same pulse duration (i.e., bandwidth) or different pulse durations (i.e., bandwidths). A signal amplitude of the excitation signals is also configurable and may vary between excitation signals. Pulses of a pulse train may have a constant (fixed) amplitude or varied amplitudes. A number of pulses used in a pulse train is also configurable among excitation signals. A pulse frequency (i.e., a period between successive pulses of a pulse train) may also be configurable and may be different among excitation signals that have a pulse train. A pulse train comprising signal chirps may have fixed (constant) start and stop frequencies among signal chirps or may have variable start and/or stop frequencies among signal chirps. The signal chirps may have the same pulse duration or have different pulse durations.

On the receiver side, the sensor circuit 107 includes an analog signal processing chain and/or a digital signal processing chain, both of which may include one or more optional components. The analog signal processing chain may include a direct down-converter and a low-pass filter as optional components. The direct down-converter may include any form of direct down-conversion of the ultrasonic reflected waves 113 and 114. For example, squaring, absolute value, or rectification, among other examples, may be used for performing the direct down-conversion. Analog circuit blocks for such a down-conversion processing may include a multiplier or a diode. A low-pass filter cut-off frequency may be tuned to the bandwidth of the transmitted ultrasonic signal and the bandwidth of the transmitter 105. For example, the low-pass filter cut-off frequency may be set to 1 MHz or 2 MHZ.

In some implementations, the sensor circuit 107 may include an analog-to-digital converter (ADC) that is configured to generate multiple digital samples (e.g., measurement samples) from the ultrasonic reflected waves 113 and 114 for each ultrasonic transmit wave 112 and store the digital samples in memory for evaluation. Additionally, or alternatively, in some implementations, the sensor circuit 107 may include an ADC that is configured to generate multiple digital samples from a measurement signal obtained from measuring another property of the ultrasonic touch sensor 100 (e.g., internal pressure, bias voltage, or a cross-coupling effect) and store the digital samples in memory for evaluation.

A digital processor of the sensor circuit 107 may be operable to evaluate digital samples received in an observation window using the touch detection algorithm to determine whether there is a no-touch event or a touch event corresponding to the ultrasonic transmit wave 112. The digital processor may use different observation windows for evaluating the ultrasonic reflected waves 113 and 114, which is possible due to a timing difference between when the ultrasonic reflected wave 113 is reflected by the first interface 110 and when the ultrasonic reflected wave 114 is reflected by the second interface 111. That is, the sensor circuit 107 can anticipate when the ultrasonic reflected waves 113 and 114 will be received based on a principle of time-of-flight. For example, a time-of-flight of a first reflection (e.g., the ultrasonic reflected wave 113) is a time required for the ultrasonic transmit wave 112 to travel from the transmitter 105, to the first interface 110, and back to the receiver 106. Likewise, a time-of-flight of a second reflection (e.g., the ultrasonic reflected wave 114) is a time required for the ultrasonic transmit wave 112 to travel from the transmitter 105, to the second interface 111, and back to the receiver 106. In both instances, an approximate distance traveled and the speed of travel of the ultrasonic signal are known parameters. Thus, each observation window has a predetermined start time and a predetermined end time for evaluating a respective one of the ultrasonic reflected waves 113 and 114.

As indicated above, FIG. 1 is provided as an example. Other examples may differ from what is described with regard to FIG. 1. For example, in some implementations, an array or transmitters, receivers, or transceivers may be provided within the ultrasound chamber 103 of the ultrasonic touch sensor 100. In some implementations, the touch structure 102 may include multiple layers resulting in more than two ultrasound reflections or echoes. In some implementations, additional circuit components may be added without deviating from the disclosure provided above.

Figure 2:
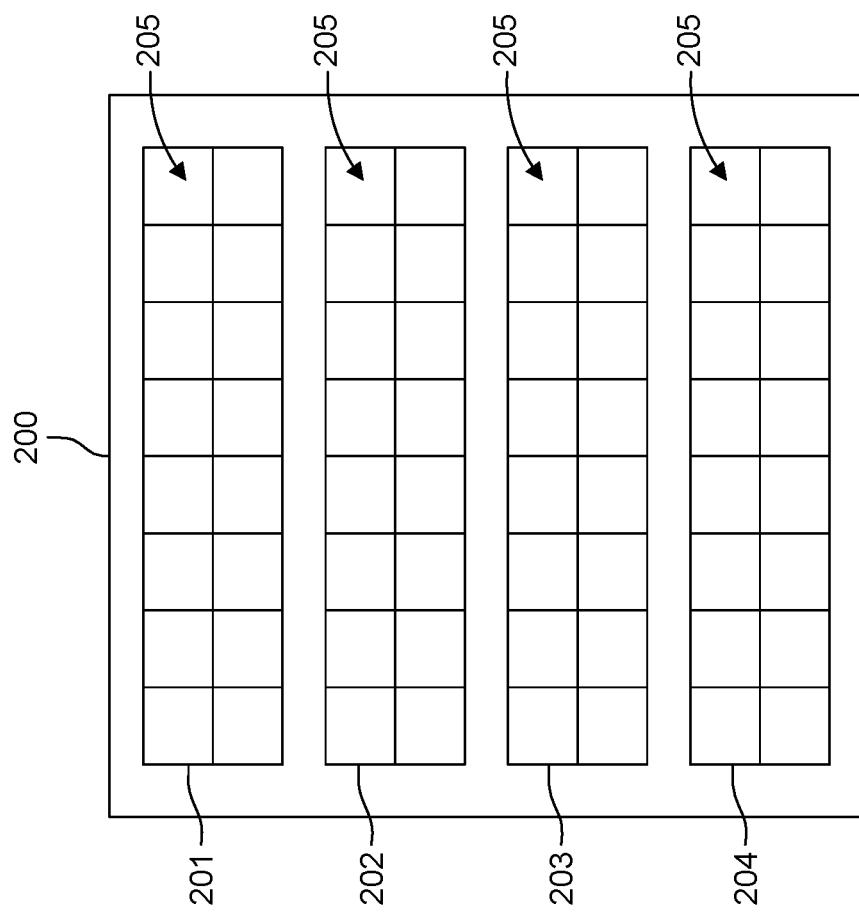
FIG. 2 illustrates a top view of an array of transceiver transducers according to one or more implementations.

FIG. 2 illustrates a top view of an array of transceiver transducers 200 according to one or more implementations. The array of transceiver transducers 200 extends in two dimensions within the ultrasound chamber 103 to cover a substantial area under the touch structure 102. The array of transceiver transducers 200 may include two or more sub-arrays 201-204 that each includes a subset of transceiver transducers 205. Individual transceiver transducers 205 of the array 200 are configurable as transmitters, receivers, or transceivers. Additionally, the individual transceiver transducers 205 of the array 200 may be individually configured into a receiving mode, a transmitting mode, or a transceiving mode on a static (e.g., fixed) basis or on a dynamic basis. As a result, the transceiver transducers 205 may be configured to provide a configuration best suited for making a touch/no-touch decision.

This configurability may be set on an individual basis (transducer-by-transducer), on a sub-array basis, or some other basis. Moreover, while the transceiver transducers 205 are shown to be substantially equal in size, the transceiver transducers 205 may vary in size. For example, the transducers of sub-array 201 may be larger than the transducers of sub-array 202. The size of an acoustic wave produced by a single transducer is proportional to the size (i.e., to the membrane area) of that transducer.

Each of the transceiver transducers 205 of the array 200 is separately controllable by the sensor circuit 107. The transceiver transducers 205 may be individually excited, alone or in combination, as transmitters and may be individually configured, alone or in combination, for receiving ultrasound waves. When one or more transceiver transducers 205 are excited, each transceiver transducer 205 produces its own ultrasonic transmit wave with acoustic aperture or beam width (e.g., proportional to the size of the membrane). If two or more transceiver transducers 205 are activated simultaneously, their respective ultrasonic transmit waves combine either constructively or deconstructively via constructive or deconstructive interference to produce a combined (superimposed or compounded) ultrasonic transmit wave that has a main directivity lobe and possibly additional side lobes. The individual wavefronts may be spherical, but the individual wavefronts may combine in front of the array 200 to create a plane wave, which is a beam of ultrasonic waves travelling in a specific direction. The transmission direction or orientation angle of the main directivity lobe is said to correspond to the traveling direction of the plane wave. When only a single transmit transducer is activated, the main directivity lobe corresponds to the individual wavefront produced by that transmit transducer.

Whether one transceiver transducer 205 is excited or multiple transceiver transducers 205 are excited, the main directivity lobe has one or more directivity characteristics that can be adjusted by a controller. Directivity characteristics of the main directivity lobe includes transmission direction, orientation angle, acoustic aperture size, beam width, or beam height, among other examples. As a result, beam sizing, beam forming, and beam steering can be realized by modulating the activation of the transceiver transducers 205 to control the directivity characteristic of the main directivity lobe by selectively generating at least one respective excitation signal. Changing the directivity characteristic of the main directivity lobe changes the area of incidence of the main directivity lobe on the first interface 110 and the second interface 111.

A receiver circuit of the sensor circuit 107 is configured to receive at least one measurement signal generated by one or more transceiver transducers and determine whether a no-touch event or a touch event has occurred at the touch surface 104 based on at least one measurement signal received from the array 200. In some implementations, the receiver circuit may perform a signal amplitude threshold analysis by comparing the amplitude(s) of received measurement signal(s) with a threshold and determining whether a touch event or a no-touch event has occurred based on a result of the comparison.

The sensor circuit 107 further includes a controller (e.g., a microcontroller) configured to modulate an activation of the transceiver transducers 205 or the operating modes of the transceiver transducers 205.

As indicated above, FIG. 2 is provided as an example. Other examples may differ from what is described with regard to FIG. 2. In some implementations, additional circuit components may be added without deviating from the disclosure provided above.

Figure 3:
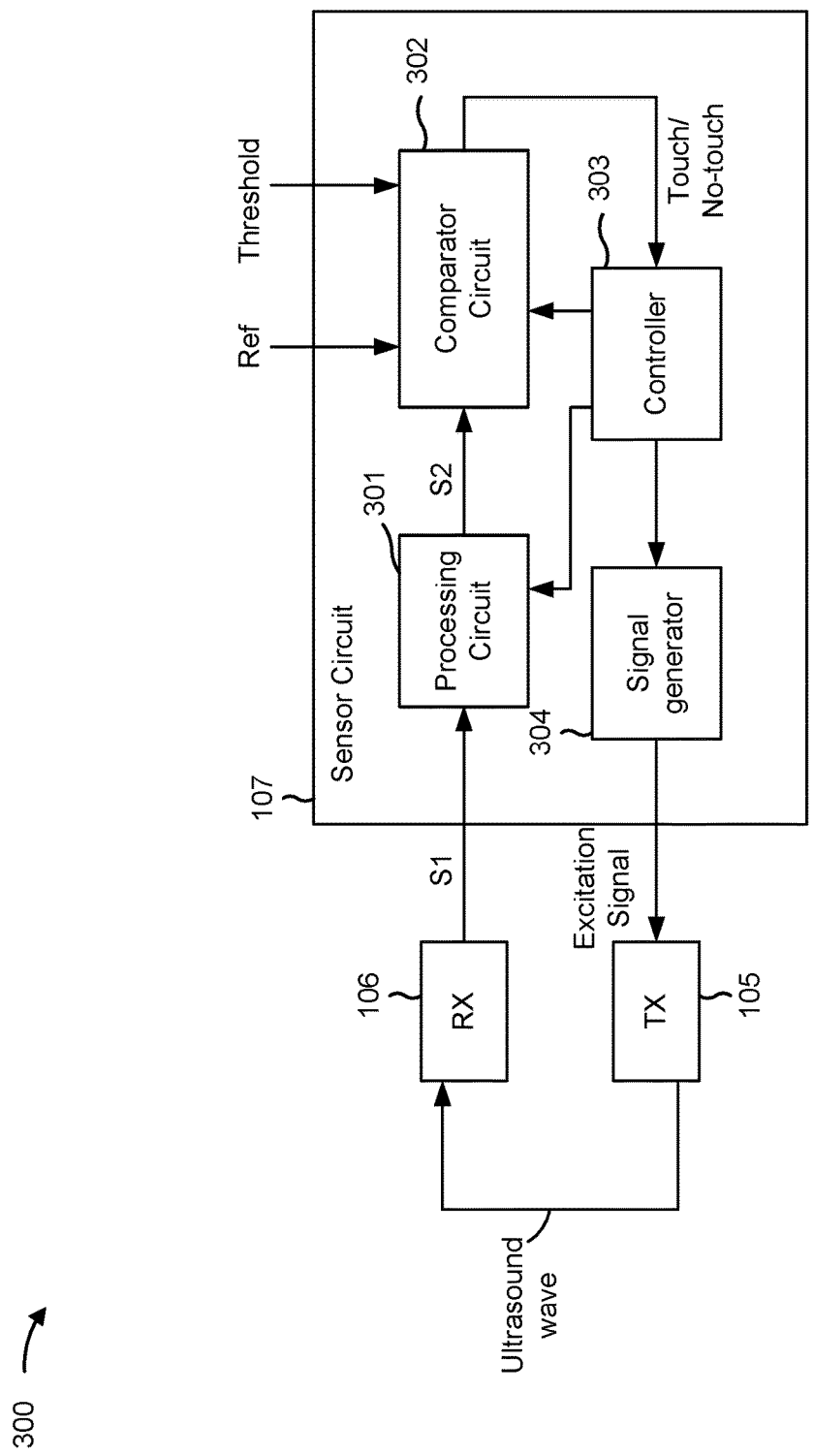
FIG. 3 illustrates a schematic block diagram of an ultrasonic touch sensor according to one or more implementations.

FIG. 3 illustrates a schematic block diagram of an ultrasonic touch sensor 300 according to one or more implementations. The ultrasonic touch sensor 300 is similar to the ultrasonic touch sensor 100 described above in conjunction with FIG. 1. The ultrasonic touch sensor 300 includes the transmitter 105 and the receiver 106. The transmitter 105 and the receiver 106 are acoustically coupled such that the receiver 106 receives reflected ultrasound waves (e.g., ultrasonic reflected waves 113 and 114) from an ultrasound wave (e.g., ultrasonic transmit wave 112) transmitted by the transmitter 105.

The ultrasonic touch sensor 300 also includes a sensor circuit 107 that is electrically coupled to the transmitter 105 and the receiver 106. In some implementations, the sensor circuit 107 includes a processing circuit 301, a comparator circuit 302, a controller 303, and a signal generator 304. The processing circuit 301 and the comparator circuit 302 may form a measurement circuit used for measuring signals and determining whether a no-touch event or a touch event has occurred at the touch surface 104.

In some implementations, the controller 303 may control (e.g., trigger) the signal generator 304 to generate an excitation signal and transmit the excitation signal to the transmitter 105. The transmitter 105 is configured to receive the excitation signal and transmit the ultrasonic transmit wave 112 toward the touch structure 102 based on the excitation signal.

The receiver 106 may be configured to generate a measurement signal S1 representative of an ultrasonic reflected wave (e.g., ultrasonic reflected wave 114), which may be evaluated during a corresponding observation window.

The processing circuit 301 is configured to process the measurement signal S1 in order to determine a feature of the measurement signal S1 and generate a measured value S2 based on the feature of the measurement signal S1. In some implementations, the processing circuit 301 may include a processor, included in the sensor circuit 107, that is configured to evaluate the feature of the measurement signal S1 in order to generate the measured value S2 that is representative of the feature of the measurement signal S1. The processor may include an analog processing circuit that operates in an analog domain, a digital processing circuit that operates in a digital domain, or both the analog processing circuit and the digital processing circuit, for evaluating the feature of the measurement signal S1 and for generating the measured value S2. Thus, the measured value S2 may be an analog value or a digital value.

The processor may be operable in combination with other processing components of the processing circuit 301 described herein to generate the measured value. For example, the processing circuit 301 may include an ADC that converts the measurement signal S1 into the digital domain for processing by a digital processor, such as a digital signal processor (DSP). The ADC may generate multiple digital samples (e.g., measurement samples) from the measurement signal S1 during the corresponding observation window and provide the multiple digital samples to the digital processor for processing. The processor may receive the multiple digital samples and generate the measured value S2 from one or more of the multiple digital samples.

In some implementations, the processing circuit 301 (e.g., the processor) may be configured to measure a function of an amplitude of the measurement signal S1 during the corresponding observation window to generate the measured value S2. For example, the measured value S2 may be a global extremum of the measurement signal S1 measured within a predetermined measurement interval (e.g., the corresponding observation window), a maximum peak-to-peak amplitude of the measurement signal S1 measured within the predetermined measurement interval, an average amplitude of the measurement signal S1 measured within the predetermined measurement interval, or a median amplitude of the measurement signal S1 measured within the predetermined measurement interval.

In some implementations, the processing circuit 301 (e.g., the processor) may be configured to calculate a distance of the measurement signal S1 relative to the reference signal during the corresponding observation window to generate the measured value S2. For example, the processing circuit 301 may calculate a Euclidean distance between the measurement signal S1 and the reference signal as the measured value S2, a squared Euclidian distance between the measurement signal S1 and the reference signal as the measured value S2, a Chebyshev distance between the measurement signal S1 and the reference signal as the measured value S2, a Manhattan distance between the measurement signal S1 and the reference signal as the measured value S2, or a Minkowski distance between the measurement signal S1 and the reference signal as the measured value S2.

The comparator circuit 302 is configured to perform a comparison of the measurement signal S1 with a threshold and determine whether a no-touch event or a touch event has occurred at the touch surface 104 based on whether the first measurement signal S1 satisfies the threshold. In some implementations, the comparator circuit 302 may compare the measured value S2 to the threshold, detect the no-touch event when the measured value S2 does not satisfy the threshold (e.g., the measured value S2 is equal to or greater than the threshold, the measured value S2 is greater than the threshold, or the measured value S2 does not satisfy another condition relative to the threshold), and detect the touch event when the measured value S2 satisfies the threshold (e.g., the measured value S2 is equal to or less than the threshold, the measured value S2 is less the threshold, or the measured value S2 satisfies another condition relative to the threshold).

In some implementations, the comparator circuit 302 may detect the no-touch event when a difference between the measured value S2 and a first reference value Ref does not satisfy the threshold (e.g., the difference is equal to or less than the threshold, the difference is less the threshold, or the difference satisfies another condition relative to the threshold), and detect the touch event when the difference between the measured value S2 and the reference value Ref satisfies the threshold (e.g., the difference is equal to or greater than the threshold, the difference is greater than the threshold, or the difference satisfies another condition relative to the threshold). For example, the comparator circuit 302 may calculate the difference between the measured value S2 and the reference value Ref for performing a comparison of the difference with the threshold for generating a comparison result.

If the sensor circuit 107 calculates the measured value S2 as the distance of the measurement signal S1 relative to the reference signal, the comparator circuit 302 may be configured to detect the no-touch event when the measured value S2 does not satisfy the threshold (e.g., the measured value is equal to or less than the threshold, the measured value is less the threshold, or the measured value satisfies another condition relative to the threshold), and may detect the touch event when the measured value satisfies the threshold (e.g., the measured value is equal to or greater than the threshold, the measured value is greater than the threshold, or the measured value satisfies another condition relative to the threshold).

The comparator circuit 302 is configured to make a touch/no-touch decision based on the comparison result. The comparator circuit 302 may transmit a decision output signal that is indicative of the touch/no-touch decision to the controller 303 that may be configured to perform additional actions or functions based on a result of the touch/no-touch decision.

As indicated above, FIG. 3 is provided as an example. Other examples may differ from what is described with regard to FIG. 3. The number and arrangement of components shown in FIG. 3 are provided as an example. In practice, the ultrasonic touch sensor 300 may include additional components, fewer components, different components, or differently arranged components than those shown in FIG. 3. Two or more components shown in FIG. 3 may be implemented within a single component, or a single component shown in FIG. 3 may be implemented as multiple, distributed components. Additionally, or alternatively, a set of components (e.g., one or more components) of the ultrasonic touch sensor 300 may perform one or more functions described as being performed by another set of components of the ultrasonic touch sensor 300. In some implementations, the ultrasonic touch sensor 300 may be configured to target any ultrasonic reflected wave for measurement that undergoes a change in response to a touch event (e.g., a direct touch event or an indirect touch event) occurrent at the touch surface 104 or a change in response to a change in touch environment. Such a configuration would enable the ultrasonic touch sensor 300 flexibility to accommodate different types of touch structures, different types of touch gestures, and/or different types of touch environments.

Figure 4:
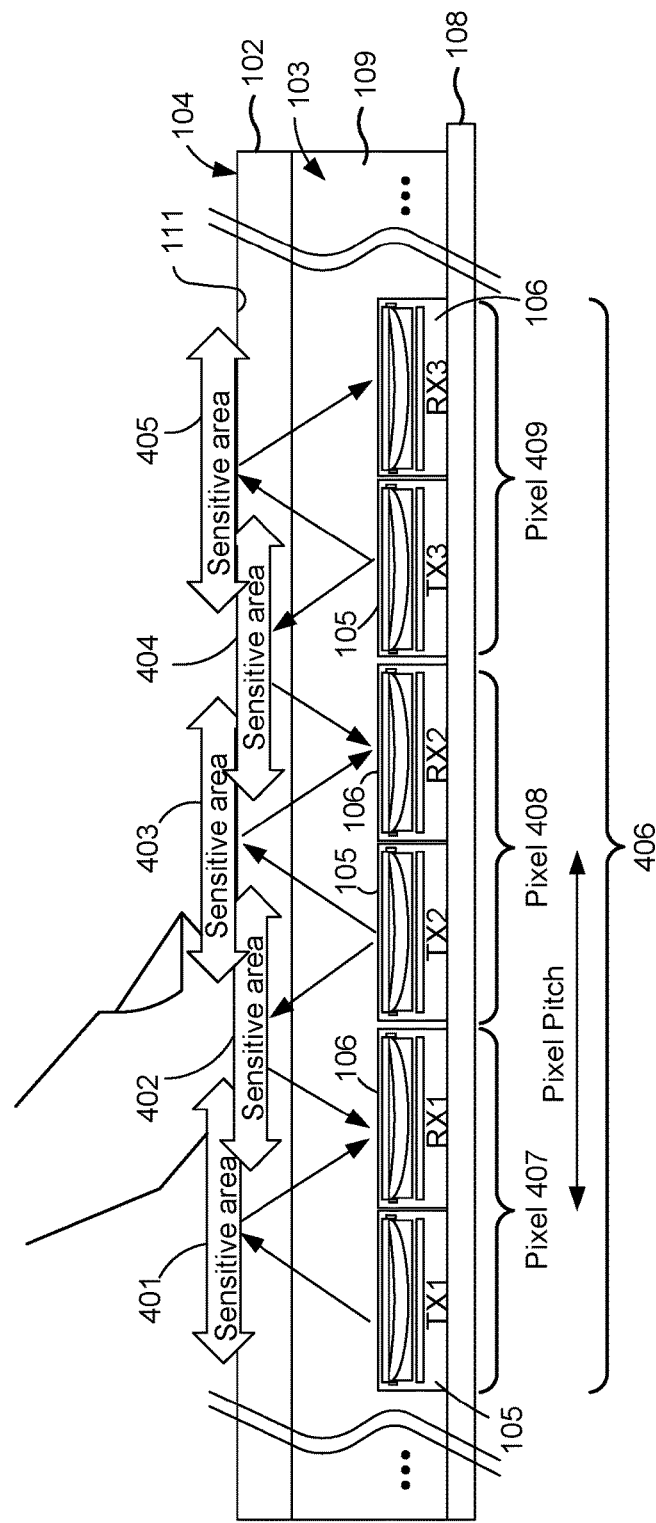
FIG. 4 illustrates an ultrasonic touch sensor according to one or more implementations.

FIG. 4 illustrates an ultrasonic touch sensor 400 according to one or more implementations. The ultrasonic touch sensor 400 includes the touch structure 102 (e.g., a touch substrate), the ultrasound chamber 103, the coupling medium 109, a plurality of transmitters 105 (e.g., transmitter TX1, transmitter TX2, and transmitter TX3), and a plurality of receivers 106 (e.g., receiver RX1, receiver RX2, and receiver RX3). The ultrasonic touch sensor 400 further includes the sensor circuit 107 (not illustrated). The plurality of transmitters 105, the plurality of receivers 106, and the sensor circuit 107 may be arranged on the common circuit substrate 108.

The touch structure 102, arranged over the ultrasound chamber 103, may have a touch surface 104 that has a plurality of sensitive areas 401-405 that are configured to receive at least one touch. The touch structure 102 may also include the second interface 111 (e.g., the touch interface) at the touch surface 104. The plurality of sensitive areas 401-405 may be contiguous (e.g., with edges of each sensitive area touching) or may be partially overlapping. In other words, neighboring sensitive areas of the plurality of sensitive areas may be contiguous or partially overlapping. For example, the sensitive area 401 and the sensitive area 402 may be neighboring sensitive areas that are continuous or partially overlapping with each other. Similarly, the sensitive area 402 and the sensitive area 403 may be neighboring sensitive areas that are continuous or partially overlapping with each other. As a result, the plurality of sensitive areas 401-405 may form a continuous sensitive area across the touch surface 104. In addition, the plurality of sensitive areas 401-405 may include a plurality of first sensitive areas (e.g., odd numbered sensitive areas 401, 403, and 405) and a plurality of second sensitive areas (e.g., even numbered sensitive areas 402 and 404) interleaved with the plurality of first sensitive areas on a first alternating basis.

The ultrasonic touch sensor 400 may further include a pixel array of capacitive ultrasonic transducers 406 that includes a plurality of pixels (e.g., pixel 407, pixel 408, and pixel 409) formed by the plurality of transmitters 105 and the plurality of receivers 106. For example, each pixel of the plurality of pixels includes a respective capacitive ultrasonic transmitter and a respective capacitive ultrasonic receiver. In other words, the plurality of transmitters 105 and the plurality of receivers 106 are configured in pixel pairs, where each pixel pair forms a respective pixel of the pixel array of capacitive ultrasonic transducers 406. Each pixel (e.g., pixel 407, pixel 408, and pixel 409) may be configured to monitor for a touch at a respective first sensitive area of the plurality of first sensitive areas and at a respective second sensitive area of the plurality of second sensitive areas. That is, each pixel may be used to monitor for a touch at one or two corresponding sensitive areas. Moreover, the two corresponding sensitive areas may be different for each pixel. For example, the pixel 407 may be configured to monitor for a touch at sensitive areas 401 and 402, the pixel 408 may be configured to monitor for a touch at sensitive areas 403 and 404, and the pixel 409 may be configured to monitor for a touch at sensitive area 405 and optionally another sensitive area (not illustrated). A resolution of the sensitive areas 401-403 may be greater than a resolution of the pixel array of capacitive ultrasonic transducers 406 that is defined by a pixel pitch.

Each transmitter 105 may be configured to simultaneously transmit a respective ultrasonic transmit wave at the respective first sensitive area and the respective second sensitive area. For example, an ultrasonic transmit wave transmitted by the transmitter TX1 may be simultaneously transmitted at the sensitive area 401 and a sensitive area located to the left of the sensitive area 401. An ultrasonic transmit wave transmitted by the transmitter TX2 may be simultaneously transmitted at the sensitive areas 402 and 403. An ultrasonic transmit wave transmitted by the transmitter TX3 may be simultaneously transmitted at the sensitive areas 404 and 405.

Each pixel (e.g., pixel 407, pixel 408, and pixel 409) may be configured to generate a measurement signal that is representative of a first respective ultrasonic reflected wave reflected by the touch interface at the respective first sensitive area or that is representative of a second respective ultrasonic reflected wave reflected by the touch interface at the respective second sensitive area. For example, the receiver RX1 may be configured to generate a measurement signal that is representative of a first respective ultrasonic reflected wave reflected by the second interface 111 at sensitive area 401 or that is representative of a second respective ultrasonic reflected wave reflected by the second interface 111 at sensitive area 402. Similarly, the receiver RX2 may be configured to generate a measurement signal that is representative of a first respective ultrasonic reflected wave reflected by the second interface 111 at sensitive area 403 or that is representative of a second respective ultrasonic reflected wave reflected by the second interface 111 at sensitive area 404. Similarly, the receiver RX3 may be configured to generate a measurement signal that is representative of a first respective ultrasonic reflected wave reflected by the second interface 111 at sensitive area 404 or that is representative of a second respective ultrasonic reflected wave reflected by the second interface 111 at sensitive area 404.

The sensor circuit 107 may be configured to receive the measurement signal of a respective pixel (e.g., a measurement signal from pixel 407, 408, or 409) of the plurality of pixels and determine whether the measurement signal of the respective pixel corresponds to the respective first sensitive area or to the respective second sensitive area of the respective pixel. In other words, the sensor circuit 107 is configured to determine which sensitive area corresponds to the measurement signal such that a location on the touch surface 104 can be determined without any gaps in touch sensitivity. As a result, the sensor circuit 107 may be configured to associate a touch/no-touch decision with the respective first sensitive area or the respective second sensitive area that is determined to correspond to the measurement signal of a respective pixel.

Based on receiving a measurement signal from a respective pixel (e.g., from one of the receivers 106), the sensor circuit 107 may be configured to perform a comparison based on the measurement signal of the respective pixel and a threshold, and determine whether a no-touch event or a touch event has occurred at the respective first sensitive area or the respective second sensitive area that is determined to correspond to the measurement signal of the respective pixel based on whether the measurement signal of the respective pixel satisfies the threshold. For example, if the sensor circuit 107 receives a measurement signal from pixel 408, the sensor circuit 107 may determine whether the measurement signal corresponds to the sensitive area 402 or the sensitive area 403. The sensor circuit 107 may also determine whether a no-touch event or a touch event has occurred based on whether the measurement signal of the respective pixel satisfies the threshold. As a result, the sensor circuit 107 may associate the no-touch event or the touch event with the sensitive area that has been determined to correspond to the measurement signal received from pixel 408 (e.g., the no-touch event or the touch event may be associated with the sensitive area 402 or the sensitive area 403).

Alternatively, if the sensor circuit 107 receives a measurement signal from pixel 409, the sensor circuit 107 may determine whether the measurement signal corresponds to the sensitive area 404 or the sensitive area 405. The sensor circuit 107 may also determine whether a no-touch event or a touch event has occurred based on whether the measurement signal of the respective pixel satisfies the threshold. As a result, the sensor circuit 107 may associate the no-touch event or the touch event with the sensitive area that has been determined to correspond to the measurement signal received from pixel 409 (e.g., the no-touch event or the touch event may be associated with the sensitive area 404 or the sensitive area 405).

The transmitters 105 and the receivers 106 may be interleaved with each other on a second alternating basis (e.g., TX1, RX1, TX2, RX2, TX3, RX3). In some implementations, the transmitters 105 may be configured to sequentially transmit a plurality of ultrasonic transmit waves based on a time multiplexing sequence. For example, the transmitter TX1 may transmit a first ultrasonic transmit wave, followed by the transmitter TX2 transmitting a second ultrasonic transmit wave, and followed by the transmitter TX3 transmitting a third ultrasonic transmit wave. Each transmission may occur after a predetermined interval after a previous transmission to allow sufficient processing time of a measurement signal that corresponds to the previous transmission. A transmission order of the time multiplexing sequence may be configurable. In some implementations, a transmission sequence performed by the transmitters 105 may be based on a time interleaving sequence such that the transmissions of the plurality of ultrasonic transmit waves are interleaved. For example, the time multiplexing sequence may include a time interleaving sequence.

The transmitters 105 may be configured to sequentially transmit a plurality of ultrasonic transmit waves according to a sequence of transmission time slots. For example, each transmitter 105 may be configured to transmit a respective ultrasonic transmit wave of the plurality of ultrasonic transmit waves in a respective transmission time slot of the sequence of transmission time slots. The sequence of transmission time slots may be allocated to the transmitters 105 based on the time multiplexing sequence and/or the time interleaving sequence. The sensor circuit 107 may be configured to assign each transmission time slot of the sequence of transmission time slots to one or more transmitters 105. In some implementations, each transmission time slot may correspond to only one transmitter 105.

In some implementations, the transmitter TX1 of the pixel 407 may be configured to transmit a first ultrasonic transmit wave in a first transmission time slot, the transmitter TX2 of the pixel 408 may be configured to transmit a second ultrasonic transmit wave in a second transmission time slot, and the transmitter TX3 of the pixel 409 may be configured to transmit a third ultrasonic transmit wave in a third transmission time slot.

The receiver RX1 of pixel 407 may be configured to receive a first respective ultrasonic reflected wave corresponding to the first ultrasonic transmit wave in a first reception time slot that corresponds to the first transmission time slot, and receive a second respective ultrasonic reflected wave corresponding to the second ultrasonic transmit wave in a second reception time slot that corresponds to the second transmission time slot. The sensor circuit 107 may be configured to determine that a measurement signal of the pixel 407 (e.g., generated by the receiver RX1) corresponds to the sensitive area 401 if the measurement signal of the pixel 407 corresponds to the first reception time slot, and may determine that the measurement signal of the pixel 407 corresponds to the sensitive area 402 if the measurement signal of the pixel 407 corresponds to the second reception time slot. Thus, the receiver RX1 may be configured to receive ultrasonic reflected waves from two neighboring pixels or adjacent pixels (e.g., pixel 407 and pixel 408), and the sensor circuit 107 may be configured to determine which sensitive area an ultrasonic reflected wave corresponds to based on knowledge of a timing of the transmission time slots allocated to the two neighboring pixels 407 and 408.

As another example, the receiver RX2 of pixel 408 may be configured to receive a third respective ultrasonic reflected wave corresponding to the second ultrasonic transmit wave in the second reception time slot that corresponds to the second transmission time slot, and receive a fourth respective ultrasonic reflected wave corresponding to the third ultrasonic transmit wave in a third reception time slot that corresponds to the third transmission time slot. The sensor circuit 107 may be configured to determine that a measurement signal of the pixel 408 (e.g., generated by the receiver RX2) corresponds to the sensitive area 403 if the measurement signal of the pixel 408 corresponds to the second reception time slot, and may determine that the measurement signal of the pixel 408 corresponds to the sensitive area 404 if the measurement signal of the pixel 408 corresponds to the third reception time slot. Thus, the receiver RX2 may be configured to receive ultrasonic reflected waves from two neighboring pixels or adjacent pixels (e.g., pixel 408 and pixel 409), and the sensor circuit 107 may be configured to determine which sensitive area an ultrasonic reflected wave corresponds to based on knowledge of a timing of the transmission time slots allocated to the two neighboring pixels 408 and 409. Accordingly, the plurality of pixels (e.g., pixels 407-409) may sequentially transmit a plurality of ultrasonic transmit waves according to a time multiplexing sequence, and the sensor circuit 107 may determine whether the measurement signal of a respective pixel corresponds to a respective first sensitive area or to a respective second sensitive area of the respective pixel based on the time multiplexing sequence.

In some implementations, the transmitters 105 may transmit a plurality of ultrasonic transmit waves having different transmission parameters. For example, neighboring pixels or adjacent pixels may transmit ultrasonic transmit waves having different transmission parameters. As a result, a sensitive area from which an ultrasonic reflected wave is received may be determined based on a transmission parameter of the ultrasonic reflected wave that is associated with the transmission parameter of the ultrasonic transmit wave. In addition, transmitters 105 of neighboring pixels may be configured to transmit sequentially (e.g., in a time multiplexed manner) or in parallel (e.g., simultaneously). For example, the transmitter TX1 of the pixel 407 may transmit a first ultrasonic transmit wave having a first transmission parameter, and the transmitter TX2 of the pixel 408 may transmit a second ultrasonic transmit wave having a second transmission parameter that is different than the first transmission parameter. In some implementations, the transmitter TX3 of the pixel 409 may transmit a third ultrasonic transmit wave having a third transmission parameter that is different than the first transmission parameter and the second transmission parameter. In some implementations, the transmitter TX3 of the pixel 409 may transmit the third ultrasonic transmit wave having the first transmission parameter. For example, since the pixel 407 and the pixel 409 are not neighboring pixels, the transmitter TX1 and the transmitter TX3 may transmit ultrasonic transmit waves with a same transmission parameter.

In some implementations, the first transmission parameter may be a first frequency and the second transmission parameter may be a second frequency. In some implementations, the first transmission parameter may be a first signal modulation and the second transmission parameter may be a second signal modulation. For example, the first signal modulation may be an up-chirp and the second signal modulation may be a down-chirp, or vice versa. The up-chirp may a first frequency ramp with increasing frequency and the down-chirp may be a second frequency ramp with decreasing frequency. Thus, a signal modulation may be a frequency modulation, an amplitude modulation, and/or a phase modulation.

The receiver RX1 of the pixel 407 may receive a first respective ultrasonic reflected wave corresponding to the first ultrasonic transmit wave transmitted by the transmitter TX1, and receive a second respective ultrasonic reflected wave corresponding to the second ultrasonic transmit wave transmitted by the transmitter TX2. The sensor circuit 107 may determine that a measurement signal from the pixel 407 (e.g., from the receiver RX1) corresponds to the sensitive area 401 if the measurement signal from the pixel 407 has a first property that corresponds to the first transmission parameter, and may determine that the measurement signal from the pixel 407 corresponds to the sensitive area 402 if the measurement signal from the pixel 407 has a second property that corresponds to the second transmission parameter. Similarly, the sensor circuit 107 may evaluate a property of a measurement signal received from the pixel 408 (e.g., from the receiver RX2), and determine whether the measurement signal corresponds to the sensitive area 403 or the sensitive area 404 based on the transmission parameters of the transmitter TX2 and the transmitter TX3. In some implementations, each transmitter 105 may be configured to simultaneously transmit a respective ultrasonic transmit wave at a respective first sensitive area and a respective second sensitive area, and the sensor circuit 107 may be able to distinguish the measurement signals based on respective transmission parameters.

The sensor circuit 107 may be configured to simultaneously detect multiple touches in multiple sensitive areas. For example, the sensor circuit 107 may simultaneously detect multiple touches in multiple sensitive areas in one reception time slot. In addition, based on detecting a touch event at one of the sensitive areas 401-403, the pixel array of capacitive ultrasonic transducers 406 may be configured to focus a haptic feedback ultrasonic wave at the sensitive area corresponding to the touch event.

As indicated above, FIG. 4 is provided as an example. Other examples may differ from what is described with regard to FIG. 4.

Figure 5:
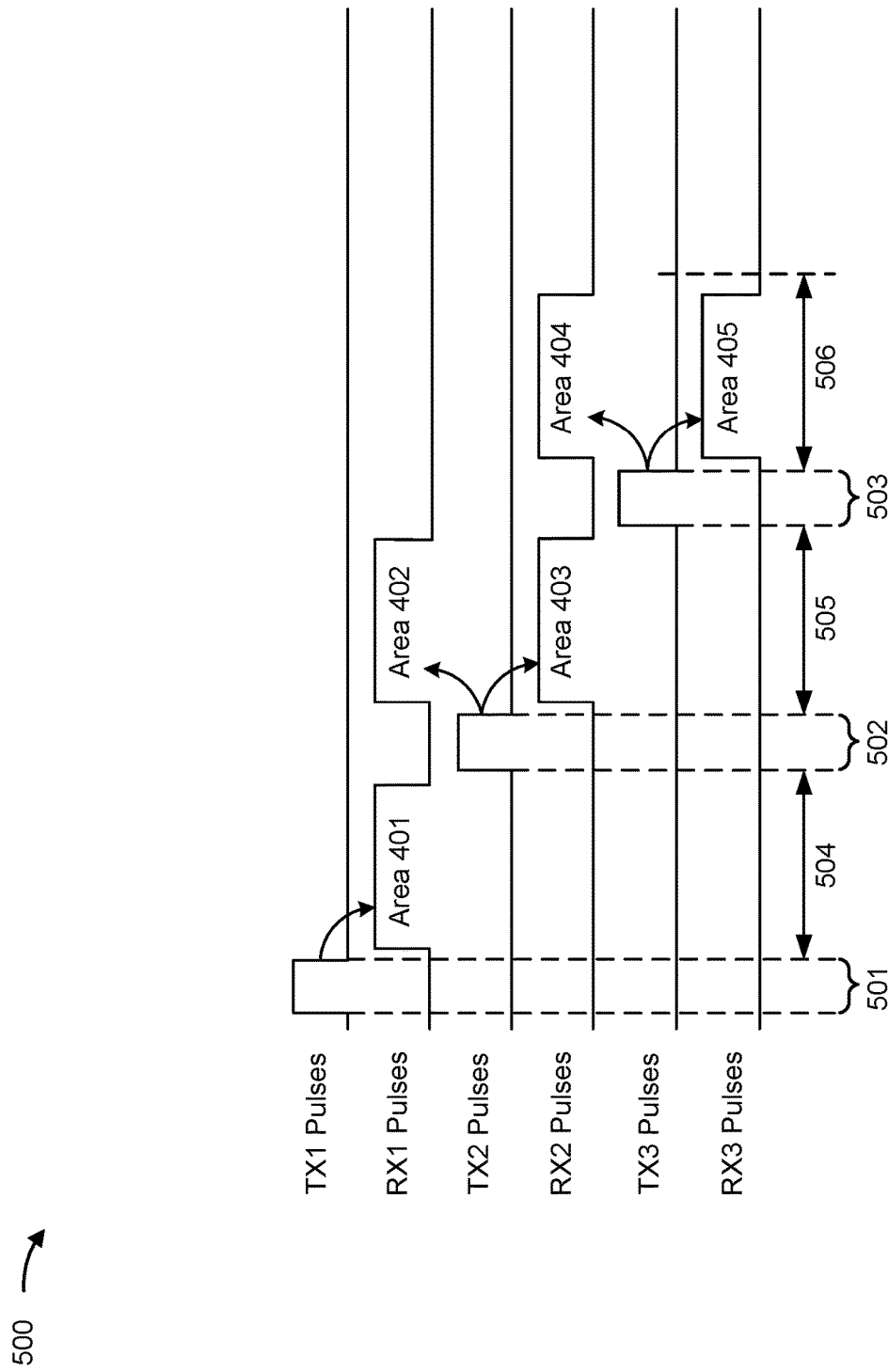
FIG. 5 illustrates a diagram of a transmission and receiving sequence according to one or more implementations.

FIG. 5 illustrates a diagram 500 of a transmission and receiving sequence according to one or more implementations. The transmission sequence may be a time multiplexing sequence that uses a sequence of transmission time slots for transmitting ultrasonic transmit waves. Ultrasonic reflected waves (e.g., echoes) may be evaluated in respective reception time slots in order to determine a corresponding sensitive area. For example, the transmitter TX1 of the pixel 407 may be assigned a first transmission time slot 501, the transmitter TX2 of the pixel 408 may be assigned a second transmission time slot 502, and the transmitter TX3 of the pixel 409 may be assigned a third transmission time slot 503. Thus, the transmitter TX1 may be configured to transmit a first ultrasonic transmit wave (e.g., a first ultrasonic pulse) in the first transmission time slot 501, the transmitter TX2 may be configured to transmit a second ultrasonic transmit wave (e.g., a second ultrasonic pulse) in the second transmission time slot 502, and the transmitter TX3 may be configured to transmit a third ultrasonic transmit wave (e.g., a third ultrasonic pulse) in the third transmission time slot 503.

A first reception time slot 504 may correspond to the first transmission time slot 501. For example, the first reception time slot 504 may be a time interval during which reflections of the first ultrasonic transmit wave are expected to be received by one or more receivers 106. The second transmission time slot 502 may follow the first reception time slot 504. A second reception time slot 505 may correspond to the second transmission time slot 502. For example, the second reception time slot 505 may be a time interval during which reflections of the second ultrasonic transmit wave are expected to be received by one or more receivers 106. The third transmission time slot 503 may follow the second reception time slot 505. A third reception time slot 506 may correspond to the third transmission time slot 503. For example, the third reception time slot 506 may be a time interval during which reflections of the third ultrasonic transmit wave are expected to be received by one or more receivers 106. A fourth transmission time slot (not illustrated) may follow the third reception time slot 506.

The receiver RX1 may be configured to receive a first respective ultrasonic reflected wave corresponding to the first ultrasonic transmit wave in the first reception time slot 504 that corresponds to the first transmission time slot 501. The sensor circuit 107, having knowledge of the transmission sequence and a mapping of transmitters 105 and receivers 106 to respective sensitive areas, may be configured to determine that a measurement signal generated by the receiver RX1 based on an echo received in the first reception time slot 504 corresponds to the sensitive area 401. For example, having knowledge that the transmitter TX1 transmits the first ultrasonic transmit wave in the first transmission time slot 501, the sensor circuit 107 may assume that receivers 106 that are adjacent to the transmitter TX1 will receive echoes corresponding to the first ultrasonic transmit wave and that receivers 106 that are not adjacent to the transmitter TX1 will not receive echoes corresponding to the first ultrasonic transmit wave. Since the receiver RX1 is associated with the sensitive areas 401 and 402, and the transmitter TX1, in this example, is only associated with sensitive area 401, the sensor circuit 107 can determine that the echoes received during the first reception time slot 504 originate from the sensitive area 401. Thus, the sensor circuit 107 may associate a touch/no-touch decision determined from the measurement signal generated by the receiver RX1 during the first reception time slot 504 with the sensitive area 401.

The receiver RX1 may be configured to receive a second respective ultrasonic reflected wave, corresponding to the second ultrasonic transmit wave, in the second reception time slot 505 that corresponds to the second transmission time slot 502. In addition, the receiver RX2 may be configured to receive a third respective ultrasonic reflected wave, corresponding to the second ultrasonic transmit wave, in the second reception time slot 505 that corresponds to the second transmission time slot 502. In other words, echoes of the second ultrasonic transmit wave transmitted by the transmitter TX2 may be received by both receivers RX1 and RX2 that are adjacent to the transmitter TX2. The transmitter TX2 may be associated with the sensitive areas 402 and 403, whereas the receiver RX1 may be associated with the sensitive areas 401 and 402, and the receiver RX2 may be associated with the sensitive areas 403 and 404. The sensor circuit 107, having knowledge of the transmission sequence and a mapping of transmitters 105 and receivers 106 to respective sensitive areas, may be configured to determine that a measurement signal generated by the receiver RX1 based on an echo received in the second reception time slot 505 corresponds to the sensitive area 402. For example, having knowledge that the transmitter TX2 transmits the second ultrasonic transmit wave in the second transmission time slot 502, the sensor circuit 107 may assume that receivers 106 that are adjacent to the transmitter TX2 will receive echoes corresponding to the second ultrasonic transmit wave and that receivers 106 that are not adjacent to the transmitter TX2 will not receive echoes corresponding to the second ultrasonic transmit wave. Since the receiver RX1 is associated with sensitive areas 401 and 402, and the transmitter TX2 is associated with sensitive areas 402 and 403, the sensor circuit 107 can determine that the echoes received by the receiver RX1 during the second reception time slot 505 originate from the sensitive area 402. Additionally, since the receiver RX2 is associated with sensitive areas 403 and 404 and the transmitter TX2 is associated with sensitive areas 402 and 403, the sensor circuit 107 can determine that the echoes received by the receiver RX3 during the second reception time slot 505 originate from the sensitive area 403.

Thus, the sensor circuit 107 may associate a touch/no-touch decision determined from the measurement signal generated by the receiver RX1 during the second reception time slot 505 with the sensitive area 402. Additionally, the sensor circuit 107 may associate a touch/no-touch decision determined from the measurement signal generated by the receiver RX3 during the second reception time slot 505 with the sensitive area 403.

The receiver RX2 may be configured to receive a fourth respective ultrasonic reflected wave, corresponding to the third ultrasonic transmit wave, in the third reception time slot 506 that corresponds to the third transmission time slot 503. In addition, the receiver RX3 may be configured to receive a fifth respective ultrasonic reflected wave, corresponding to the third ultrasonic transmit wave, in the third reception time slot 506 that corresponds to the third transmission time slot 503. In other words, echoes of the third ultrasonic transmit wave transmitted by the transmitter TX3 may be received by both receivers RX2 and RX3 that are adjacent to the transmitter TX3. The transmitter TX3 may be associated with the sensitive areas 404 and 405, whereas the receiver RX2 may be associated with the sensitive areas 403 and 404, and the receiver RX3 may be associated with the sensitive area 405. The sensor circuit 107, having knowledge of the transmission sequence and a mapping of transmitters 105 and receivers 106 to respective sensitive areas, may be configured to determine that a measurement signal generated by the receiver RX2 based on an echo received in the third reception time slot 506 corresponds to the sensitive area 404. For example, having knowledge that the transmitter TX3 transmits the third ultrasonic transmit wave in the third transmission time slot 503, the sensor circuit 107 may assume that receivers 106 that are adjacent to the transmitter TX3 will receive echoes corresponding to the third ultrasonic transmit wave and that receivers 106 that are not adjacent to the transmitter TX3 will not receive echoes corresponding to the third ultrasonic transmit wave. Since the receiver RX2 is associated with sensitive areas 403 and 404 and the transmitter TX3 is associated with sensitive areas 404 and 405, the sensor circuit 107 can determine that the echoes received by the receiver RX2 during the third reception time slot 506 originate from the sensitive area 404. Additionally, since the receiver RX3 is associated with sensitive area 405 and the transmitter TX3 is associated with sensitive areas 404 and 405, the sensor circuit 107 can determine that the echoes received by the receiver RX3 during the third reception time slot 506 originate from the sensitive area 405. Thus, the sensor circuit 107 may associate a touch/no-touch decision determined from the measurement signal generated by the receiver RX2 during the third reception time slot 506 with the sensitive area 404. Additionally, the sensor circuit 107 may associate a touch/no-touch decision determined from the measurement signal generated by the receiver RX3 during the third reception time slot 506 with the sensitive area 405.

As indicated above, FIG. 5 is provided as an example. Other examples may differ from what is described with regard to FIG. 5.

Figure 6:
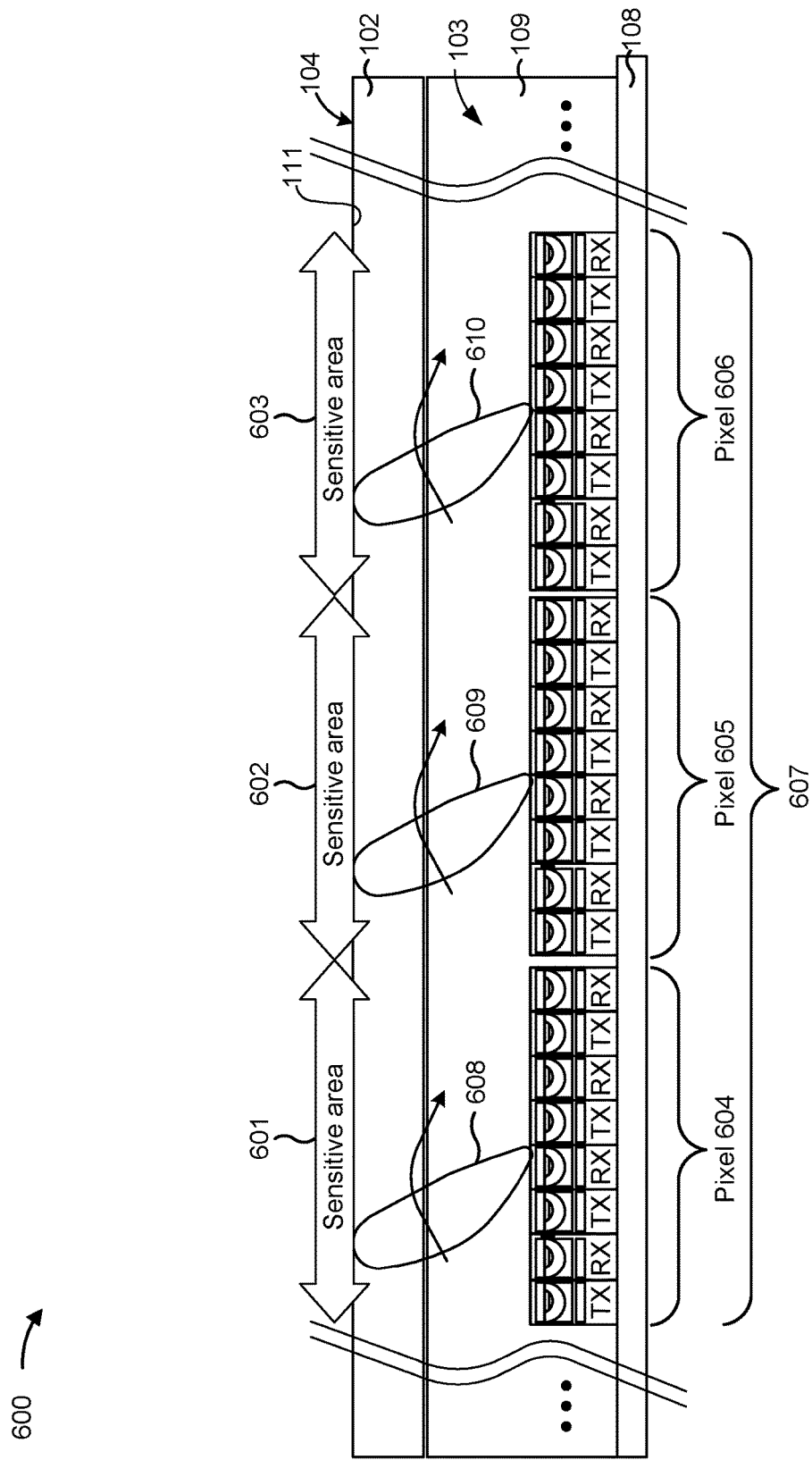
FIG. 6 illustrates an ultrasonic touch sensor according to one or more implementations.

FIG. 6 illustrates an ultrasonic touch sensor 600 according to one or more implementations. The ultrasonic touch sensor 600 includes the touch structure 102 (e.g., a touch substrate), the ultrasound chamber 103, the coupling medium 109, a plurality of transmitters 105, and a plurality of receivers 106. The ultrasonic touch sensor 400 may further include the sensor circuit 107 (not illustrated). The plurality of transmitters 105, the plurality of receivers 106, and the sensor circuit 107 may be arranged on the common circuit substrate 108.

The touch structure 102, arranged over the ultrasound chamber 103, may have a touch surface 104 that has a plurality of sensitive areas 601-603 that are configured to receive at least one touch. The touch structure 102 may also include the second interface 111 (e.g., the touch interface) at the touch surface 104. The plurality of sensitive areas 601-603 may be contiguous (e.g., with edges of each sensitive area touching) or may be partially overlapping. In some implementations, each sensitive area 601-603 may include two or more contiguous sensitive areas. As a result, the plurality of sensitive areas 601-603 may form a continuous sensitive area across the touch surface 104.

The ultrasonic touch sensor 400 may further include a plurality of pixels (e.g., pixel 604, pixel 605, and pixel 606) that form a pixel array of capacitive ultrasonic transducers 607. Each pixel may be associated with a respective sensitive area of the sensitive areas 601-603. For example, pixel 604 may be associated with sensitive area 601, pixel 605 may be associated with sensitive area 602, and pixel 606 may be associated with sensitive area 603. Each pixel may include multiple transmitters 105 and multiple receivers 106. Each pixel may be configured to generate a scanning beam that is steered in a sweeping motion to scan a respective sensitive area. For example, pixel 604 may generate a scanning beam 608 that is steered in a sweeping motion to scan the sensitive area 601, pixel 605 may generate a scanning beam 609 that is steered in a sweeping motion to scan the sensitive area 602, and pixel 606 may generate a scanning beam 610 that is steered in a sweeping motion to scan the sensitive area 603. The pixels 604-606 may use a beam forming technique to form a scanning beam and to steer the scanning beam in the sweeping motion. In some implementations, a plurality of phase shifts may be used as the beam forming technique. For example, a respective plurality of transmitters of pixel 604 may be configured to simultaneously transmit respective ultrasonic transmit waves that are phase shifted from each other. A direction of the scanning beam 608 may be altered by changing phase shifts of the respective ultrasonic transmit waves. As a result, the pixels 604-606 may simultaneously transmit the scanning beams 608-610 for scanning the sensitive areas 601-603. In some implementations, a scanning angle of the scanning beams 608-610 may be synchronized such that the scanning beams are parallel to each other. A respective plurality of receivers of each pixel 604-606 may be configured to receive ultrasonic reflected waves (e.g., echoes) from a respective sensitive area 601-603. Thus, the sensor circuit 107 may associate a touch/no-touch decision determined from the measurement signal generated by a respective pixel with the respective sensitive area 601-603.

The sensor circuit 107 may be configured to simultaneously detect multiple touches in multiple sensitive areas. For example, the sensor circuit 107 may simultaneously detect multiple touches in multiple sensitive areas in one reception time slot. In addition, based on detecting a touch event at one of the sensitive areas 601-603, the pixel array of capacitive ultrasonic transducers 607 may be configured to focus a haptic feedback ultrasonic wave at the sensitive area corresponding to the touch event.

As indicated above, FIG. 6 is provided as an example. Other examples may differ from what is described with regard to FIG. 6.

Figure 7:
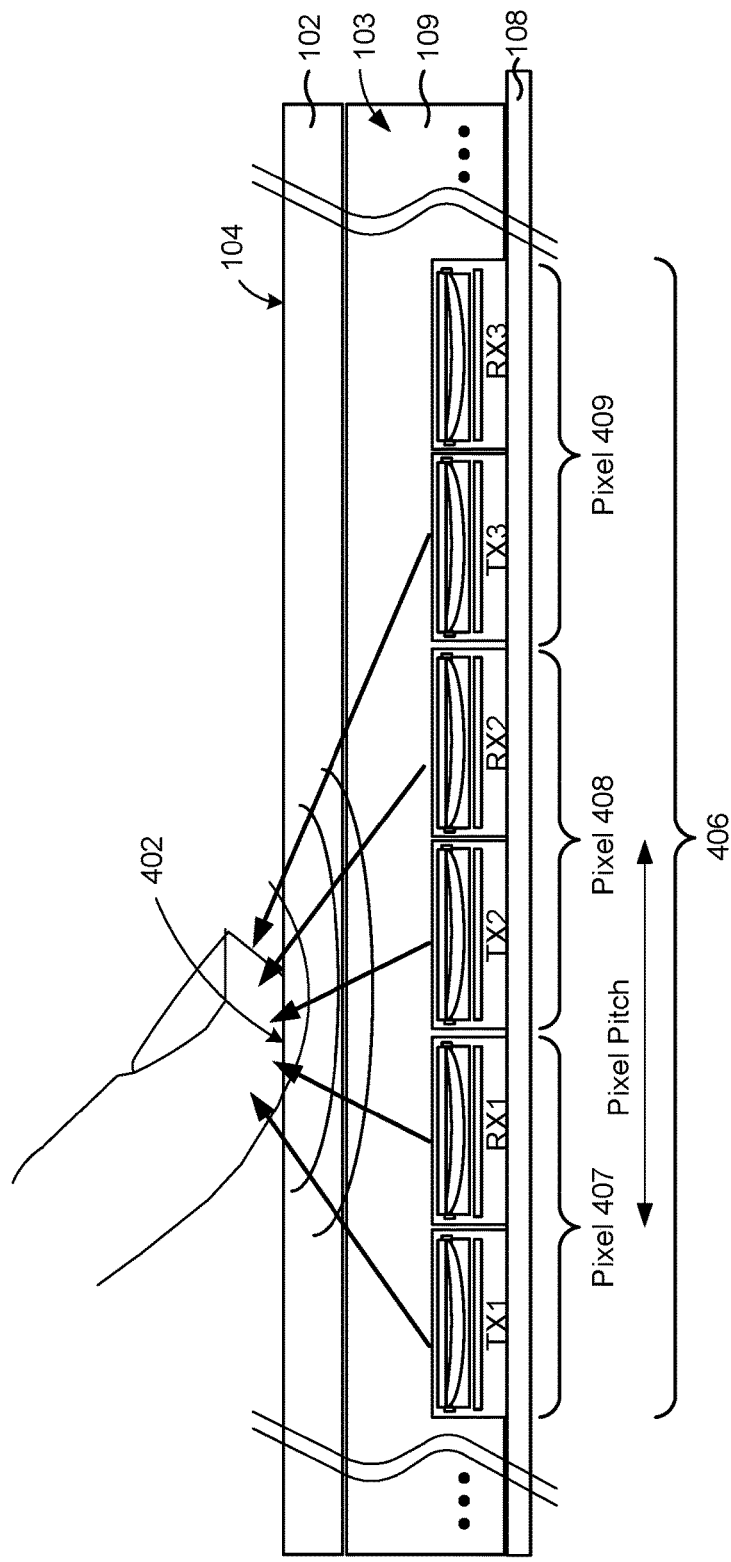
FIG. 7 illustrates an ultrasonic touch sensor according to one or more implementations.

FIG. 7 illustrates an ultrasonic touch sensor 700 according to one or more implementations. The ultrasonic touch sensor 700 may be similar to the ultrasonic touch sensor 400 described in connection with FIG. 4. Alternatively, the ultrasonic touch sensor 700 may be similar to the ultrasonic touch sensor 600 described in connection with FIG. 6. Each transmitter 105 and each receiver 106 may be a capacitive ultrasonic transducer capable of transmitting in a transmitting mode and receiving in a receiving mode.

In addition to associating a measurement signal of a respective pixel 407-409 with one of the sensitive areas (e.g., one of the sensitive areas 401-405), the sensor circuit 107 may be configured to perform a comparison based on the measurement signal and a threshold for detecting a no-touch event or a touch event. The sensor circuit 107 may determine whether the no-touch event or the touch event has occurred at a respective sensitive area that has been determined to correspond to the measurement signal of the respective pixel based on whether the measurement signal of the respective pixel satisfies the threshold. If the touch event is detected, the sensor circuit 107 may configure the capacitive ultrasonic transducers, including transmitters 105 and receivers 106, into the transmitting mode to generate a haptic feedback wave that is directed at the respective sensitive area at which the touch event is detected. For example, based on detecting a first touch event at the sensitive area 401, the pixel array of capacitive ultrasonic transducers 406 may be configured to focus a first haptic feedback ultrasonic wave at the sensitive area 401 corresponding to the first touch event. Alternatively, based on detecting a second touch event at the sensitive area 402, the pixel array of capacitive ultrasonic transducers 406 may be configured to focus a second haptic feedback ultrasonic wave at the sensitive area 402 corresponding to the second touch event. For example, the transmitter TX1, the receiver RX1, the transmitter TX2, the receiver RX2, and the transmitter TX3 may be configured to transmit ultrasonic transmit waves at the sensitive area 402. In some implementations, the sensor circuit 107 may configure the pixel array of capacitive ultrasonic transducers 406 to perform a beam forming technique to direct a haptic feedback ultrasonic wave at a particular sensitive area. Thus, the pixel array of capacitive ultrasonic transducers 406 may focus the haptic feedback ultrasonic wave at the sensitive area corresponding to the touch event.

As indicated above, FIG. 7 is provided as an example. Other examples may differ from what is described with regard to FIG. 7.

The following provides an overview of some Aspects of the present disclosure:

Aspect 1: An ultrasonic touch sensor, comprising: a housing having an ultrasound chamber; a touch structure arranged over the ultrasound chamber, wherein the touch structure comprises a touch surface having a plurality of sensitive areas configured to receive at least one touch, wherein the touch structure comprises a touch interface at the touch surface, wherein neighboring sensitive areas of the plurality of sensitive areas are contiguous or partially overlapping, and wherein the plurality of sensitive areas include a plurality of first sensitive areas and a plurality of second sensitive areas interleaved with the plurality of first sensitive areas on a first alternating basis; a pixel array of capacitive ultrasonic transducers comprising a plurality of pixels, wherein each pixel of the plurality of pixels includes a respective capacitive ultrasonic transmitter and a respective capacitive ultrasonic receiver, wherein each pixel of the plurality of pixels is configured to monitor for the at least one touch at a respective first sensitive area of the plurality of first sensitive areas and at a respective second sensitive area of the plurality of second sensitive areas, and wherein each pixel of the plurality of pixels is configured to generate a measurement signal that is representative of a first respective ultrasonic reflected wave reflected by the touch interface at the respective first sensitive area or that is representative of a second respective ultrasonic reflected wave reflected by the touch interface at the respective second sensitive area; and a sensor circuit configured to receive the measurement signal of a respective pixel of the plurality of pixels and determine whether the measurement signal of the respective pixel corresponds to the respective first sensitive area or to the respective second sensitive area of the respective pixel.

Aspect 2: The ultrasonic touch sensor of Aspect 1, wherein the sensor circuit is configured to associate a touch/no-touch decision with the respective first sensitive area or the respective second sensitive area that is determined to correspond to the measurement signal of the respective pixel.

Aspect 3: The ultrasonic touch sensor of any of Aspects 1-2, wherein the sensor circuit is configured to perform a comparison based on the measurement signal of the respective pixel and a threshold, and determine whether a no-touch event or a touch event has occurred at the respective first sensitive area or the respective second sensitive area that is determined to correspond to the measurement signal of the respective pixel based on whether the measurement signal of the respective pixel satisfies the threshold.

Aspect 4: The ultrasonic touch sensor of any of Aspects 1-3, wherein the pixel array of capacitive ultrasonic transducers comprises a plurality of capacitive ultrasonic transmitters and a plurality of capacitive ultrasonic receivers that are interleaved with the plurality of capacitive ultrasonic transmitters on a second alternating basis.

Aspect 5: The ultrasonic touch sensor of Aspect 4, wherein the plurality of capacitive ultrasonic transmitters are configured to sequentially transmit a plurality of ultrasonic transmit waves based on a time multiplexing sequence.

Aspect 6: The ultrasonic touch sensor of Aspect 4, wherein the plurality of capacitive ultrasonic transmitters are configured to sequentially transmit a plurality of ultrasonic transmit waves based on a time interleaving sequence.

Aspect 7: The ultrasonic touch sensor of Aspect 4, wherein the plurality of capacitive ultrasonic transmitters are configured to sequentially transmit a plurality of ultrasonic transmit waves according to a sequence of transmission time slots, and wherein each capacitive ultrasonic transmitter of the plurality of capacitive ultrasonic transmitters is configured to transmit a respective ultrasonic transmit wave of the plurality of ultrasonic transmit waves in a respective transmission time slot of the sequence of transmission time slots.

Aspect 8: The ultrasonic touch sensor of Aspect 7, wherein the sensor circuit is configured to assign each transmission time slot of the sequence of transmission time slots to a single capacitive ultrasonic transmitter of the plurality of capacitive ultrasonic transmitters.

Aspect 9: The ultrasonic touch sensor of Aspect 4, wherein the plurality of capacitive ultrasonic transmitters are configured to transmit a plurality of ultrasonic transmit waves having different transmission parameters.

Aspect 10: The ultrasonic touch sensor of Aspect 4, wherein a first capacitive ultrasonic transmitter of a first pixel of the plurality of pixels is configured to transmit a first ultrasonic transmit wave having a first transmission parameter, wherein a second capacitive ultrasonic transmitter of a second pixel of the plurality of pixels is configured to transmit a second ultrasonic transmit wave having a second transmission parameter different than the first transmission parameter, and wherein the first pixel and the second pixel are neighboring pixels or adjacent pixels.

Aspect 11: The ultrasonic touch sensor of Aspect 10, wherein a capacitive ultrasonic receiver of the first pixel is configured to receive the first respective ultrasonic reflected wave corresponding to the first ultrasonic transmit wave, and receive the second respective ultrasonic reflected wave corresponding to the second ultrasonic transmit wave, and the sensor circuit is configured to determine that a measurement signal of the first pixel corresponds to the respective first sensitive area if the measurement signal of the first pixel has a first property that corresponds to the first transmission parameter, and determine that the measurement signal of the first pixel corresponds to the respective second sensitive area if the measurement signal of the first pixel has a second property that corresponds to the second transmission parameter.

Aspect 12: The ultrasonic touch sensor of Aspect 10, wherein the first transmission parameter is a first frequency and the second transmission parameter is a second frequency.

Aspect 13: The ultrasonic touch sensor of Aspect 10, wherein the first transmission parameter is a first signal modulation and the second transmission parameter is a second signal modulation.

Aspect 14: The ultrasonic touch sensor of Aspect 13, wherein the first signal modulation is an up-chirp and the second signal modulation is a down-chirp.

Aspect 15: The ultrasonic touch sensor of Aspect 14, wherein the up-chirp is a first frequency ramp with increasing frequency and the down-chirp is a second frequency ramp with decreasing frequency.

Aspect 16: The ultrasonic touch sensor of Aspect 4, wherein a first capacitive ultrasonic transmitter of a first pixel of the plurality of pixels is configured to transmit a first ultrasonic transmit wave in a first transmission time slot, wherein a second capacitive ultrasonic transmitter of a second pixel of the plurality of pixels is configured to transmit a second ultrasonic transmit wave in a second transmission time slot, wherein a capacitive ultrasonic receiver of the first pixel is configured to receive the first respective ultrasonic reflected wave corresponding to the first ultrasonic transmit wave in a first reception time slot that corresponds to the first transmission time slot, and receive the second respective ultrasonic reflected wave corresponding to the second ultrasonic transmit wave in a second reception time slot that corresponds to the second transmission time slot, and wherein the sensor circuit is configured to determine that a measurement signal of the first pixel corresponds to the respective first sensitive area if the measurement signal of the first pixel corresponds to the first reception time slot, and determine that the measurement signal of the first pixel corresponds to the respective second sensitive area if the measurement signal of the first pixel corresponds to the second reception time slot.

Aspect 17: The ultrasonic touch sensor of Aspect 16, wherein the first pixel and the second pixel are neighboring pixels or adjacent pixels.

Aspect 18: The ultrasonic touch sensor of any of Aspects 1-17, wherein the plurality of pixels are configured to sequentially transmit a plurality of ultrasonic transmit waves according to a time multiplexing sequence, and wherein the sensor circuit is configured to determine whether the measurement signal of the respective pixel corresponds to the respective first sensitive area or to the respective second sensitive area of the respective pixel based on the time multiplexing sequence.

Aspect 19: The ultrasonic touch sensor of any of Aspects 1-18, wherein each respective capacitive ultrasonic transmitter is configured to simultaneously transmit a respective ultrasonic transmit wave at the respective first sensitive area and the respective second sensitive area.

Aspect 20: The ultrasonic touch sensor of any of Aspects 1-19, wherein each pixel of the plurality of pixels includes a respective plurality of capacitive ultrasonic transmitters and a respective plurality of capacitive ultrasonic receivers, wherein the respective plurality of capacitive ultrasonic transmitters of each pixel is configured to generate a scanning beam that is steered in a sweeping motion to scan a respective sensitive area of the plurality of sensitive areas.

Aspect 21: The ultrasonic touch sensor of any of Aspects 1-20, wherein the sensor circuit is configured to perform a comparison based on the measurement signal of the respective pixel and a threshold, and determine whether a no-touch event or a touch event has occurred at the respective first sensitive area or the respective second sensitive area that is determined to correspond to the measurement signal of the respective pixel based on whether the measurement signal of the respective pixel satisfies the threshold, wherein, based on detecting the touch event at the respective first sensitive area, the pixel array of capacitive ultrasonic transducers is configured to focus a first haptic feedback ultrasonic wave at the respective first sensitive area corresponding to the touch event, and wherein, based on detecting the touch event at the respective second sensitive area, the pixel array of capacitive ultrasonic transducers is configured to focus a second haptic feedback ultrasonic wave at the respective second sensitive area corresponding to the touch event.

Aspect 22: The ultrasonic touch sensor of any of Aspects 1-21, wherein the sensor circuit is configured to measure a function of an amplitude of the measurement signal of the respective pixel to generate a measured value, detect a no-touch event when the measured value does not satisfy a threshold, and detect a touch event when the measured value satisfies the threshold.

Aspect 23: The ultrasonic touch sensor of Aspect 22, wherein the measured value is a global extremum of the measurement signal of the respective pixel measured within a predetermined measurement interval, a maximum peak-to-peak amplitude of the measurement signal of the respective pixel measured within the predetermined measurement interval, an average amplitude of the measurement signal of the respective pixel measured within the predetermined measurement interval, or a median amplitude of the measurement signal of the respective pixel measured within the predetermined measurement interval.

Aspect 24: The ultrasonic touch sensor of any of Aspects 1-23, wherein the sensor circuit is configured to measure a function of an amplitude of the measurement signal of the respective pixel to generate a measured value, detect a no-touch event when a difference between the measured value and a reference value does not satisfy a threshold, and detect a touch event when the difference satisfies the threshold.

Aspect 25: The ultrasonic touch sensor of any of Aspects 1-24, wherein the sensor circuit is configured to calculate a distance of the measurement signal of the respective pixel relative to a reference signal to generate a measured value, detect a no-touch event when the measured value does not satisfy a threshold, and detect a touch event when the measured value satisfies the threshold.

Aspect 26: The ultrasonic touch sensor of Aspect 25, wherein the distance is a Euclidean distance, a squared Euclidian distance, a Chebyshev distance, a Manhattan distance, or a Minkowski distance.

Aspect 27: An ultrasonic touch sensor, comprising: a housing having an ultrasound chamber; a touch structure arranged over the ultrasound chamber, wherein the touch structure comprises a touch surface having a plurality of sensitive areas configured to receive at least one touch, wherein the touch structure comprises a touch interface at the touch surface, wherein neighboring sensitive areas of the plurality of sensitive areas are contiguous or partially overlapping; and a pixel array of capacitive ultrasonic transducers comprising a plurality of pixels, wherein each pixel of the plurality of pixels includes a respective plurality of capacitive ultrasonic transmitters and a respective plurality of capacitive ultrasonic receivers, wherein the respective plurality of capacitive ultrasonic transmitters of each pixel is configured to generate a scanning beam that is steered in a sweeping motion to scan a respective sensitive area of the plurality of sensitive areas.

Aspect 28: The ultrasonic touch sensor of Aspect 27, further comprising: a sensor circuit configured to detect a touch event at a sensitive area of the plurality of sensitive areas based on a reflected ultrasonic wave received from the sensitive area, and wherein, based on detecting the touch event at the sensitive area, the pixel array of capacitive ultrasonic transducers is configured to focus a haptic feedback ultrasonic wave at the sensitive area corresponding to the touch event.

Aspect 29: A system configured to perform one or more operations recited in one or more of Aspects 1-28.

Aspect 30: An apparatus comprising means for performing one or more operations recited in one or more of Aspects 1-28.

Aspect 31: A non-transitory computer-readable medium storing a set of instructions, the set of instructions comprising one or more instructions that, when executed by a device, cause the device to perform one or more operations recited in one or more of Aspects 1-28.

Aspect 32: A computer program product comprising instructions or code for executing one or more operations recited in one or more of Aspects 1-28.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Any of the processing components may be implemented as a central processing unit (CPU) or other processor reading and executing a software program from a non-transitory computer-readable recording medium such as a hard disk or a semiconductor memory device. For example, instructions may be executed by one or more processors, such as one or more CPUs, digital signal processors (DSPs), general-purpose microprocessors, application-specific integrated circuits (ASICs), field programmable logic arrays (FPLAs), programmable logic controller (PLC), or other equivalent integrated or discrete logic circuitry. Accordingly, the term "processor," as used herein refers to any of the foregoing structures or any other structure suitable for implementation of the techniques described herein.

A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

A signal processing circuit and/or a signal conditioning circuit may receive one or more signals (e.g., measurement signals) from one or more components in the form of raw measurement data and may derive, from the measurement signal further information. Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a signal suitable for processing after conditioning.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some implementations, a single act may include or may be broken into multiple sub acts. Such sub acts may be included and part of the disclosure of this single act unless explicitly excluded.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An ultrasonic touch sensor, comprising:
a housing having an ultrasound chamber;
a touch structure arranged over the ultrasound chamber, wherein the touch structure comprises a touch surface having a plurality of sensitive areas configured to receive at least one touch, wherein the touch structure comprises a touch interface at the touch surface, wherein neighboring sensitive areas of the plurality of sensitive areas are contiguous or partially overlapping, and wherein the plurality of sensitive areas includes a plurality of first sensitive areas and a plurality of second sensitive areas interleaved with the plurality of first sensitive areas on a first alternating basis;
a pixel array of capacitive ultrasonic transducers comprising a plurality of pixels, wherein each pixel of the plurality of pixels includes a respective capacitive ultrasonic transmitter and a respective capacitive ultrasonic receiver, wherein each pixel of the plurality of pixels is configured to monitor for the at least one touch at a respective first sensitive area of the plurality of first sensitive areas and at a respective second sensitive area of the plurality of second sensitive areas, and wherein each pixel of the plurality of pixels is configured to generate a measurement signal that is representative of a first respective ultrasonic reflected wave reflected by the touch interface at the respective first sensitive area or that is representative of a second respective ultrasonic reflected wave reflected by the touch interface at the respective second sensitive area; and
a sensor circuit configured to receive the measurement signal of a respective pixel of the plurality of pixels and determine whether the measurement signal of the respective pixel corresponds to the respective first sensitive area or to the respective second sensitive area of the respective pixel,
wherein each respective capacitive ultrasonic transmitter is a discrete transmitter transducer having a respective flexible membrane that is configured to vibrate to produce a respective ultrasonic wave, and
wherein each respective capacitive ultrasonic receiver is a discrete receiver transducer having a respective flexible membrane that is configured to, in response to receiving a respective ultrasonic reflected wave, vibrate to produce a respective measurement signal.

2. The ultrasonic touch sensor of claim 1, wherein the sensor circuit is configured to associate a touch/no-touch decision with the respective first sensitive area or the respective second sensitive area that is determined to correspond to the measurement signal of the respective pixel.

3. The ultrasonic touch sensor of claim 1, wherein the sensor circuit is configured to perform a comparison based on the measurement signal of the respective pixel and a threshold, and determine whether a no-touch event or a touch event has occurred at the respective first sensitive area or the respective second sensitive area that is determined to correspond to the measurement signal of the respective pixel based on whether the measurement signal of the respective pixel satisfies the threshold.

4. An ultrasonic touch sensor, comprising:
a housing having an ultrasound chamber;
a touch structure arranged over the ultrasound chamber, wherein the touch structure comprises a touch surface having a plurality of sensitive areas configured to receive at least one touch, wherein the touch structure comprises a touch interface at the touch surface, wherein neighboring sensitive areas of the plurality of sensitive areas are contiguous or partially overlapping, and wherein the plurality of sensitive areas includes a plurality of first sensitive areas and a plurality of second sensitive areas interleaved with the plurality of first sensitive areas on a first alternating basis;
a pixel array of capacitive ultrasonic transducers comprising a plurality of pixels, wherein each pixel of the plurality of pixels includes a respective capacitive ultrasonic transmitter and a respective capacitive ultrasonic receiver, wherein each pixel of the plurality of pixels is configured to monitor for the at least one touch at a respective first sensitive area of the plurality of first sensitive areas and at a respective second sensitive area of the plurality of second sensitive areas, and wherein each pixel of the plurality of pixels is configured to generate a measurement signal that is representative of a first respective ultrasonic reflected wave reflected by the touch interface at the respective first sensitive area or that is representative of a second respective ultrasonic reflected wave reflected by the touch interface at the respective second sensitive area; and
a sensor circuit configured to receive the measurement signal of a respective pixel of the plurality of pixels and determine whether the measurement signal of the respective pixel corresponds to the respective first sensitive area or to the respective second sensitive area of the respective pixel,
wherein the pixel array of capacitive ultrasonic transducers comprises a plurality of capacitive ultrasonic transmitters and a plurality of capacitive ultrasonic receivers that are interleaved with the plurality of capacitive ultrasonic transmitters on a second alternating basis.

5. The ultrasonic touch sensor of claim 4, wherein the plurality of capacitive ultrasonic transmitters are configured to sequentially transmit a plurality of ultrasonic transmit waves based on a time multiplexing sequence.

6. The ultrasonic touch sensor of claim 4, wherein the plurality of capacitive ultrasonic transmitters are configured to sequentially transmit a plurality of ultrasonic transmit waves based on a time interleaving sequence.

7. The ultrasonic touch sensor of claim 4, wherein the plurality of capacitive ultrasonic transmitters are configured to sequentially transmit a plurality of ultrasonic transmit waves according to a sequence of transmission time slots, and
wherein each capacitive ultrasonic transmitter of the plurality of capacitive ultrasonic transmitters is configured to transmit a respective ultrasonic transmit wave of the plurality of ultrasonic transmit waves in a respective transmission time slot of the sequence of transmission time slots.

8. The ultrasonic touch sensor of claim 7, wherein the sensor circuit is configured to assign each transmission time slot of the sequence of transmission time slots to a single capacitive ultrasonic transmitter of the plurality of capacitive ultrasonic transmitters.

9. The ultrasonic touch sensor of claim 4, wherein the plurality of capacitive ultrasonic transmitters are configured to transmit a plurality of ultrasonic transmit waves having different transmission parameters.

10. The ultrasonic touch sensor of claim 4, wherein a first capacitive ultrasonic transmitter of a first pixel of the plurality of pixels is configured to transmit a first ultrasonic transmit wave having a first transmission parameter, wherein a second capacitive ultrasonic transmitter of a second pixel of the plurality of pixels is configured to transmit a second ultrasonic transmit wave having a second transmission parameter different than the first transmission parameter, and wherein the first pixel and the second pixel are neighboring pixels or adjacent pixels.

11. The ultrasonic touch sensor of claim 10, wherein a capacitive ultrasonic receiver of the first pixel is configured to receive the first respective ultrasonic reflected wave corresponding to the first ultrasonic transmit wave, and receive the second respective ultrasonic reflected wave corresponding to the second ultrasonic transmit wave, and the sensor circuit is configured to determine that a measurement signal of the first pixel corresponds to the respective first sensitive area if the measurement signal of the first pixel has a first property that corresponds to the first transmission parameter, and determine that the measurement signal of the first pixel corresponds to the respective second sensitive area if the measurement signal of the first pixel has a second property that corresponds to the second transmission parameter.

12. The ultrasonic touch sensor of claim 10, wherein the first transmission parameter is a first frequency and the second transmission parameter is a second frequency.

13. The ultrasonic touch sensor of claim 10, wherein the first transmission parameter is a first signal modulation and the second transmission parameter is a second signal modulation.

14. The ultrasonic touch sensor of claim 13, wherein the first signal modulation is an up-chirp and the second signal modulation is a down-chirp.

15. The ultrasonic touch sensor of claim 14, wherein the up-chirp is a first frequency ramp with increasing frequency and the down-chirp is a second frequency ramp with decreasing frequency.

16. The ultrasonic touch sensor of claim 4, wherein a first capacitive ultrasonic transmitter of a first pixel of the plurality of pixels is configured to transmit a first ultrasonic transmit wave in a first transmission time slot, wherein a second capacitive ultrasonic transmitter of a second pixel of the plurality of pixels is configured to transmit a second ultrasonic transmit wave in a second transmission time slot, wherein a capacitive ultrasonic receiver of the first pixel is configured to receive the first respective ultrasonic reflected wave corresponding to the first ultrasonic transmit wave in a first reception time slot that corresponds to the first transmission time slot, and receive the second respective ultrasonic reflected wave corresponding to the second ultrasonic transmit wave in a second reception time slot that corresponds to the second transmission time slot, and wherein the sensor circuit is configured to determine that a measurement signal of the first pixel corresponds to the respective first sensitive area if the measurement signal of the first pixel corresponds to the first reception time slot, and determine that the measurement signal of the first pixel corresponds to the respective second sensitive area if the measurement signal of the first pixel corresponds to the second reception time slot.

17. The ultrasonic touch sensor of claim 16, wherein the first pixel and the second pixel are neighboring pixels or adjacent pixels.

18. An ultrasonic touch sensor, comprising:
a housing having an ultrasound chamber;
a touch structure arranged over the ultrasound chamber, wherein the touch structure comprises a touch surface having a plurality of sensitive areas configured to receive at least one touch, wherein the touch structure comprises a touch interface at the touch surface, wherein neighboring sensitive areas of the plurality of sensitive areas are contiguous or partially overlapping, and wherein the plurality of sensitive areas includes a plurality of first sensitive areas and a plurality of second sensitive areas interleaved with the plurality of first sensitive areas on a first alternating basis;

a pixel array of capacitive ultrasonic transducers comprising a plurality of pixels, wherein each pixel of the plurality of pixels includes a respective capacitive ultrasonic transmitter and a respective capacitive ultrasonic receiver, wherein each pixel of the plurality of pixels is configured to monitor for the at least one touch at a respective first sensitive area of the plurality of first sensitive areas and at a respective second sensitive area of the plurality of second sensitive areas, and wherein each pixel of the plurality of pixels is configured to generate a measurement signal that is representative of a first respective ultrasonic reflected wave reflected by the touch interface at the respective first sensitive area or that is representative of a second respective ultrasonic reflected wave reflected by the touch interface at the respective second sensitive area; and a sensor circuit configured to receive the measurement signal of a respective pixel of the plurality of pixels and determine whether the measurement signal of the respective pixel corresponds to the respective first sensitive area or to the respective second sensitive area of the respective pixel, wherein the plurality of pixels are configured to sequentially transmit a plurality of ultrasonic transmit waves according to a time multiplexing sequence, and wherein the sensor circuit is configured to determine whether the measurement signal of the respective pixel corresponds to the respective first sensitive area or to the respective second sensitive area of the respective pixel based on the time multiplexing sequence.

19. The ultrasonic touch sensor of claim 1, wherein each respective capacitive ultrasonic transmitter is configured to simultaneously transmit a respective ultrasonic transmit wave at the respective first sensitive area and the respective second sensitive area.

20. The ultrasonic touch sensor of claim 1, wherein each pixel of the plurality of pixels includes a respective plurality of capacitive ultrasonic transmitters and a respective plurality of capacitive ultrasonic receivers, wherein the respective plurality of capacitive ultrasonic transmitters of each pixel is configured to generate a scanning beam that is steered in a sweeping motion to scan a respective sensitive area of the plurality of sensitive areas.

21. The ultrasonic touch sensor of claim 1, wherein the sensor circuit is configured to perform a comparison based on the measurement signal of the respective pixel and a threshold, and determine whether a no-touch event or a touch event has occurred at the respective first sensitive area or the respective second sensitive area that is determined to correspond to the measurement signal of the respective pixel based on whether the measurement signal of the respective pixel satisfies the threshold, wherein, based on detecting the touch event at the respective first sensitive area, the pixel array of capacitive ultrasonic transducers is configured to focus a first haptic feedback ultrasonic wave at the respective first sensitive area corresponding to the touch event, and wherein, based on detecting the touch event at the respective second sensitive area, the pixel array of capacitive ultrasonic transducers is configured to focus a second haptic feedback ultrasonic wave at the respective second sensitive area corresponding to the touch event.

22. The ultrasonic touch sensor of claim 1, wherein the sensor circuit is configured to measure a function of an amplitude of the measurement signal of the respective pixel to generate a measured value, detect a no-touch event when the measured value does not satisfy a threshold, and detect a touch event when the measured value satisfies the threshold.

23. The ultrasonic touch sensor of claim 22, wherein the measured value is a global extremum of the measurement signal of the respective pixel measured within a predetermined measurement interval, a maximum peak-to-peak amplitude of the measurement signal of the respective pixel measured within the predetermined measurement interval, an average amplitude of the measurement signal of the respective pixel measured within the predetermined measurement interval, or a median amplitude of the measurement signal of the respective pixel measured within the predetermined measurement interval.

24. The ultrasonic touch sensor of claim 1, wherein the sensor circuit is configured to measure a function of an amplitude of the measurement signal of the respective pixel to generate a measured value, detect a no-touch event when a difference between the measured value and a reference value does not satisfy a threshold, and detect a touch event when the difference satisfies the threshold.

25. The ultrasonic touch sensor of claim 1, wherein the sensor circuit is configured to calculate a distance of the measurement signal of the respective pixel relative to a reference signal to generate a measured value, detect a no-touch event when the measured value does not satisfy a threshold, and detect a touch event when the measured value satisfies the threshold.

26. The ultrasonic touch sensor of claim 25, wherein the distance is a Euclidean distance, a squared Euclidean distance, a Chebyshev distance, a Manhattan distance, or a Minkowski distance.

27. An ultrasonic touch sensor, comprising:
a housing having an ultrasound chamber;
a touch structure arranged over the ultrasound chamber, wherein the touch structure comprises a touch surface having a plurality of sensitive areas configured to receive at least one touch, wherein the touch structure comprises a touch interface at the touch surface, wherein neighboring sensitive areas of the plurality of sensitive areas are contiguous or partially overlapping; and
a pixel array of capacitive ultrasonic transducers comprising a plurality of pixels, wherein each pixel of the plurality of pixels includes a respective plurality of capacitive ultrasonic transmitters and a respective plurality of capacitive ultrasonic receivers, wherein the respective plurality of capacitive ultrasonic transmitters of each pixel is configured to generate a scanning beam that is steered in a sweeping motion to scan a respective sensitive area of the plurality of sensitive areas.

28. The ultrasonic touch sensor of claim 27, further comprising:
a sensor circuit configured to detect a touch event at a sensitive area of the plurality of sensitive areas based on a reflected ultrasonic wave received from the sensitive area, and
wherein, based on detecting the touch event at the sensitive area, the pixel array of capacitive ultrasonic transducers is configured to focus a haptic feedback ultrasonic wave at the sensitive area corresponding to the touch event.

29. The ultrasonic touch sensor of claim 27, wherein each respective capacitive ultrasonic transmitter of the respective plurality of capacitive ultrasonic transmitters is a discrete transmitter transducer having a respective flexible membrane that is configured to vibrate to produce a respective ultrasonic wave, and
wherein each respective capacitive ultrasonic receiver of the respective plurality of capacitive ultrasonic receivers is a discrete receiver transducer having a respective flexible membrane that is configured to, in response to receiving a respective ultrasonic reflected wave, vibrate to produce a respective measurement signal.

30. The ultrasonic touch sensor of claim 27, wherein the plurality of pixels is configured to simultaneously generate a plurality of scanning beams that are respectively steered in respective sweeping motions.

* * * * *